United States Patent
Legg et al.

(10) Patent No.: US 11,438,819 B2
(45) Date of Patent: Sep. 6, 2022

(54) COMMUNICATION SYSTEM SUPPORTING COMMUNICATION BETWEEN END NODE OF A VEHICLE AND A REMOTE CORRESPONDENT NODE VIA A FIXED NETWORK

(71) Applicant: BluWireless Technology Limited, Bristol (GB)

(72) Inventors: Peter Jonathon Legg, Bristol (GB); James Pascoe, Bristol (GB); Stuart Ryan, Bristol (GB)

(73) Assignee: BluWireless Technology Limited, Bristol (GB)

( * ) Notice: Subject to any disclaimer, the term of this patent is extended or adjusted under 35 U.S.C. 154(b) by 45 days.

(21) Appl. No.: 17/120,807

(22) Filed: Dec. 14, 2020

(65) Prior Publication Data
US 2021/0195485 A1  Jun. 24, 2021

(30) Foreign Application Priority Data
Dec. 19, 2019  (GB) ...................................... 1918923

(51) Int. Cl.
*H04W 36/08* (2009.01)
*H04W 4/40* (2018.01)
*H04B 7/06* (2006.01)

(52) U.S. Cl.
CPC .......... *H04W 36/08* (2013.01); *H04B 7/0617* (2013.01); *H04W 4/40* (2018.02)

(58) Field of Classification Search
CPC ..... H04W 84/005; H04W 40/02; H04W 4/06; H04W 4/48; H04W 4/42; H04W 4/40; H04W 36/18; H04W 36/00; H04W 36/08; H04B 7/0617; H04L 49/25
See application file for complete search history.

(56) References Cited

U.S. PATENT DOCUMENTS

| | | | |
|---|---|---|---|
| 11,283,730 B2* | 3/2022 | Shi | H04L 49/25 |
| 2007/0097919 A1 | 5/2007 | Tsubota | |
| 2009/0029706 A1* | 1/2009 | Prakash | H04W 36/0079 455/436 |
| 2016/0183181 A1* | 6/2016 | Lee | H04W 48/20 370/338 |
| 2019/0386849 A1* | 12/2019 | Yu | H04W 24/08 |

FOREIGN PATENT DOCUMENTS

| | | |
|---|---|---|
| WO | 2015075569 A | 5/2015 |
| WO | 2019120479 A | 6/2019 |
| WO | 2019120479 A1 | 6/2019 |

* cited by examiner

*Primary Examiner* — Allahyar Kasraian
(74) *Attorney, Agent, or Firm* — Optimus Patents US, LLC

(57) ABSTRACT

A communication system comprises access points (203, 205) communicating via directional beams and a first and second wireless modem (111, 701) for establishing a first and respectively second mm wave radio communication links to access points (203, 205). The first and second wireless modems (111, 701) are located on a vehicle (103) and employ electronically steerable beamforming directional antennas having a first main beams for establishing the radio communication links. A common network element (705) supports communication over both links and a connection control circuit (1001) switches between the links. It further transmits an address resolution message over a link when switching to that link with the message comprising identification data for the common network element (705).

22 Claims, 12 Drawing Sheets

COMMUNICATION SYSTEM SUPPORTING COMMUNICATION BETWEEN END NODE OF A VEHICLE AND A REMOTE CORRESPONDENT NODE VIA A FIXED NETWORK

FIELD OF THE INVENTION

The invention relates to a communication system supporting communication with a vehicle based node and an apparatus and method therefor, and in particular, but not exclusively, to wireless communication for a node on a train.

BACKGROUND OF THE INVENTION

Wireless communication has become ubiquitous and forms the basis of many applications and services provided to the consumer of today. A particularly widespread set of wireless communication systems, colloquially known as Wi-Fi, has been developed by the Wi-Fi Alliance and is standardized in the Institute of Electrical and Electronics Engineers' (IEEE) 802.11 standards. Wi-Fi wireless communication systems are typically used to implement Wireless Local Area Networks (WLANs) in many different environments, such as in homes, workplaces, or public areas.

Wi-Fi systems provide many functions, features and services suitable for efficient implementation of WLANs and data communication. The IEEE 802.11 standards have been, and are being, developed to provide an increasing number of functions, services and benefits. The initial versions of the IEEE 802.11 standards were based on radio communication in the 2.4 GHz band, but this has been enhanced to also include the 5 GHz band. One variant is known as IEEE 802.11ad and this further expands the standard to support communications in the 60 GHz band.

A particularly difficult challenge for a communication infrastructure is to support mobility. In particular, it is difficult to provide high data rate support for fast moving vehicles, for example, in order to support high capacity Internet access on board trains.

Conventional Wi-Fi systems allow handovers between different access points and accordingly provide some mobility support. However, the handovers and general mobility support tend to be relatively slow (with an interruption in data connectivity) and relatively complex and tend to not be suitable for faster moving mobile stations, such as fast-moving vehicles. Traditional Wi-Fi access points also tend to be limited to a relatively low capacity/throughput.

Another approach is to use cellular communication systems that are inherently developed to support mobility. However, such systems tend to have large cells and to be restricted to much lower capacity and throughput speed than desired.

A general problem is that in order to support high capacity communication with, in particular, a fast moving vehicle, a significant amount of air interface resource (spectrum) is required, and this tends to restrict the capacity that can be provided by many existing systems in already used frequency ranges. This in particular applies to both cellular and Wi-Fi based wireless communication systems. It is therefore desirable to exploit less used frequency bands and there is substantial interest in providing high capacity support of fast moving vehicles using millimetre-wave (mm) wavelength based communication, such as specifically the 60 GHz frequency band. However, the mobility challenges known from e.g. Wi-Fi systems become even more significant. For example, for 60 GHz communications, the radio communication link is directional and heavily dependent on the specific current conditions, such as distance, line of sight, etc. For a fast moving vehicle this results in an increased number of handovers and in continuously fast changing conditions. Whilst some direction changes can be accommodated by steering the antennae of the radio communication link, there is not the omnidirectional capability of typical cellular and Wi-Fi radios.

In general, the efficient usage of air interface in mm wave communication and with potentially fast-moving vehicles is a difficult challenge. This challenge is further exacerbated by the desire to provide this function in communication systems that are compatible with many existing network techniques and principles, such as Internet Protocol based routing, existing network-based mobility functions etc. A particular challenge is how to handle handovers in terms of updating the network operation and data routing as air interface links change.

Hence, an improved approach for supporting communication with moving vehicles via mm wave radio communication links would be advantageous. In particular, an approach that allows improved operation, improved reliability, increased flexibility, facilitated implementation, facilitated operation, improved resource utilization, improved performance, improved network, improved and/or facilitated data routing updating and/or improved support for communication with vehicles would be advantageous.

SUMMARY OF THE INVENTION

Accordingly, the Invention seeks to preferably mitigate, alleviate or eliminate one or more of the above-mentioned disadvantages singly or in any combination.

According to an aspect of the invention, there is provided a communication system for supporting communication between an end node of a vehicle and a remote correspondent node via a fixed network, the communication system comprising: a plurality of wireless access points of the fixed network, each wireless access point having a directional antenna arrangement for mm wave radio communication using directional beams; a first wireless modem for establishing a first link being a first mm wave radio communication link to the first access point, the first link supporting a data session between the end node and the remote correspondent node, the first wireless modem being located on the vehicle and employing a first electronically steerable beamforming directional antenna having a first main beam for establishing the first mm wave radio communication link; a second wireless modem for establishing a second link being a second mm wave radio communication link to a second access point further supporting the data session, the second wireless modem being located on the vehicle and employing a second electronically steerable beamforming directional antenna having a second main beam for establishing the second mm wave radio communication link; a common network element located on the vehicle and arranged to support communication for the data session over both the first mm wave radio communication link and the second mm wave radio communication link; a connection control circuit located on the vehicle and arranged to dynamically switch between the first mm wave radio communication link and the second mm wave radio communication link for the data session; and wherein the connection control circuit is arranged to transmit an address resolution message to the second access point over the second mm wave radio communication link for a switch from the first mm wave radio communication link to the second mm wave radio communication link; the address resolution message comprising identification data for the common network element.

The invention may provide improved and/or facilitated operation and/or improved performance for a beamform based mm wave radio communication system supporting (potentially fast) moving vehicles. The approach may in particular provide efficient and reliable communication.

The approach may provide improved performance and/or improved backwards compatibility. It may for example in many embodiments and applications allow improved air interface diversity while allowing reuse of existing equipment and network arrangements. The approach may allow an efficient, high performance, and quick adaptation of the network to changes in radio conditions as the vehicle moves. This adaptation functionality may often be achieved with minimal impact on the remaining network.

The use of beams from the directional antennas may specifically support radio communication links from different wireless modems of the vehicle to the same access point or to different access points. It may allow steering of the beams towards the same or different access points thereby enabling or improving multiple links between the vehicle and access points. This may provide improved performance.

The end node and/or wireless modems may be in/on/ attached to/move with etc. the vehicle, and may be part of a mobile network that moves with the vehicle.

The first mm wave radio communication link is formed using a first directional beam of the directional antenna arrangement of the first access point. The second mm wave radio communication link is formed using a second directional beam of the directional antenna arrangement of the first access point. The second directional beam of the directional antenna arrangement may in some situations be the same beam as the first directional beam of the directional antenna arrangement.

The connection control circuit may be arranged to transmit the address resolution message to the second access point over the second mm wave radio communication link by being arranged to trigger the transmission of the address resolution message to the second access point over the second mm wave radio communication link. In some embodiments, the address resolution message may be generated and transmitted by other functionality but under the control of the connection control circuit.

The connection control circuit may be arranged to transmit an address resolution message to the second access point over the second mm wave radio communication link following a switch from the first mm wave radio communication link to the second mm wave radio communication link; the address resolution message comprising identification data for the common network element. The connection control circuit may be arranged to transmit an address resolution message to the second access point over the second mm wave radio communication link in response to a switch from the first mm wave radio communication link to the second mm wave radio communication link; the address resolution message comprising identification data for the common network element.

The connection control circuit may in some embodiments be arranged to switch between the first mm wave radio communication link and the second mm wave radio communication link by controlling an external data switch.

A switch and/or selection between two mm wave radio communication links, such as between the first and second mm wave radio communication link, is not necessarily limited to being a switch and/or selection between only those two mm wave radio communication links but rather there may be other candidate mm wave radio communication links for the selection/switch. Thus, a selection/switch between more than two mm wave radio communication links is also inherently a selection/switch between those two mm wave radio communication links. In some embodiments, the first common network element may be arranged to select/switch between more than two mm wave radio communication links of which the first and second mm wave radio communication links are included. Such a selection/switching inherently also includes/is a selection/switch between the first and second mm wave radio communication links.

The connection control circuit may be arranged select between the first and second mm wave radio communication link. The switching between the first and second mm wave radio communication link may follow a selection of the first or second mm wave radio communication link. The connection control circuit may be arranged to switch to a mm wave radio communication link that is selected.

In many embodiments, the connection control circuit may be arranged to switch between the first and second mm wave radio communication link by controlling an external data switch function.

A switching between the first and second mm wave radio communication links may follow a selection of the first and second mm wave radio communication link. The first common network element may be arranged to switch to the mm wave radio communication link that is selected.

According to an optional feature of the invention, the first access point and the second access point are different access points.

According to an optional feature of the invention, the second access point is arranged to transmit a routing update message in response to receiving the address resolution message, the routing update message comprising identification data of the common network element.

This may allow an efficient approach for adapting the operation of the network to air interface variations. The second access point may be arranged to broadcast or unicast the routing update message.

According to an optional feature of the invention, the second access point is arranged to transmit a routing update message in response to receiving the address resolution message, the routing update message comprising an indication of an association between the second access point and the common network element.

According to an optional feature of the invention, the second access point is arranged to transmit the address resolution message in the fixed network.

This may allow an efficient approach for adapting the operation of the network to air interface variations. The second access point may be arranged to broadcast or unicast the routing update message.

According to an optional feature of the invention, the first access point and the second access point are a common access point.

The first and second access points may be the same access point in some embodiments/scenarios.

According to an optional feature of the invention, the common access point is arranged not to transmit a routing update message into the fixed network in response to receiving the address resolution message.

The second (or common) access point may be arranged to not transmit the routing update message (or the address resolution message) into the fixed network in response to a detection that the first mm wave radio communication link is a link supported by the second access point.

The second (or common) access point may be arranged to not transmit the routing update message (or the address resolution message) into the fixed network in response to a detection that the first access point is the same as the second access point.

The second (or common) access point may be arranged to not transmit the routing update message (or the address resolution message) into the fixed network in response to a detection that address resolution message indicates a common network element for which an active mm wave radio communication link is currently selected.

According to an optional feature of the invention, the common access point is arranged to update a forwarding path for the data session from the first wireless modem to the second wireless modem in response to a detection that the address resolution message is received via the second mm wave radio communication link.

According to an optional feature of the invention, the identification data comprises an IP address for the common network element.

According to an optional feature of the invention, the identification data comprises a MAC address for an interface of the common network element coupling to the end node.

The interface of the common network element may be a port or address to which the end node is arranged to forward data for the correspondent node. The interface may specifically be a single wired connection point for the data session, the first single connection point being common for the first mm wave radio communication link and the second mm wave radio communication link.

According to an optional feature of the invention, the common network element comprises a network bridge.

According to an optional feature of the invention, the connection control circuit is arranged to dynamically switch between the first mm wave radio communication link and the second mm wave radio communication link interface by adding and removing interfaces of the bridge, the interfaces being interfaces to which respectively the first wireless modem and the second wireless modem are connected.

According to an optional feature of the invention, the common network element is a network bridge implementing a first interface for the first wireless modem, a second interface for the second wireless modem, and a third interface for a wired connection to the end node, and wherein the connection control circuit is arranged to switch between the first and second first mm wave radio communication links by activating one of the first interface and the second interface and deactivating the other of the first interface and the second interface.

According to an optional feature of the invention, the address resolution message is a Gratuitous Address Resolution Protocol, GARP, message.

According to an optional feature of the invention, the common network element is arranged to provide a single wired connection point for the data session, the first single connection point being common for the first mm wave radio communication link and the second mm wave radio communication link.

According to an optional feature of the invention, the connection control circuit is arranged to select between the first mm wave radio communication link and the second mm wave radio communication link in response to a comparison of radio link condition indications for the first mm wave radio communication link and the second mm wave radio communication link.

According to an optional feature of the invention, the first electronically steerable beamforming directional antenna and the second electronically steerable beamforming directional antenna are arranged to form beams in different directions.

According to an optional feature of the invention, the connection control circuit is positioned on the vehicle.

According to an optional feature of the invention, the communication system further comprises: multipath controller arranged to communicate with a complementary multipath controller of the fixed network over a plurality of paths, the multipath controller having a first wired port for a first path of the plurality of paths connected to the first single wired connection point.

According to an optional feature of the invention, the connection control circuit is arranged to further transmit a second address resolution message to the first access point over the first mm wave radio communication link in response to, and typically following, a switch from the second mm wave radio communication link to the first mm wave radio communication link; the address resolution message comprising identification data for the common network element.

According to another aspect of the invention, there is provided an apparatus for a communication system for supporting communication between an end node of a vehicle and a remote correspondent node via a fixed network, the communication system comprising: a plurality of wireless access points of the fixed network, each wireless access point having a directional antenna arrangement for mm wave radio communication using directional beams; a first wireless modem for establishing a first link being a first mm wave radio communication link to the first access point, the first link supporting a data session between the end node and the remote correspondent node, the first wireless modem being located on the vehicle and employing a first electronically steerable beamforming directional antenna having a first main beam for establishing the first mm wave radio communication link; a second wireless modem for establishing a second link being second mm wave radio communication link to a second access point further supporting the data session, the second wireless modem being located on the vehicle and employing a second electronically steerable beamforming directional antenna having a second main beam for establishing the second mm wave radio communication link; a common network element located on the vehicle and arranged to support communication for the data session over both the first mm wave radio communication link and the second mm wave radio communication link; and the apparatus comprising: a connection control circuit located on the vehicle and arranged to dynamically switch between the first mm wave radio communication link and the second mm wave radio communication link for the data session; and wherein the connection control circuit is arranged to transmit an address resolution message to the second access point over the second mm wave radio communication link for a switch from the first mm wave radio communication link to the second mm wave radio communication link; the address resolution message comprising identification data for the common network element.

According to another aspect of the invention, there is provided a method of operation for a communication system supporting communication between an end node of a vehicle and a remote correspondent node via a fixed network, the communication system comprising: a plurality of wireless access points of the fixed network, each wireless access point having a directional antenna arrangement for mm wave radio communication using directional beams; a first wireless modem for establishing a first link being a first mm wave radio communication link to the first access point, the first link supporting a data session between the end node and the remote correspondent node, the first wireless modem being located on the vehicle and employing a first electronically steerable beamforming directional antenna having a first main beam for establishing the first mm wave radio communication link; a second wireless modem for establishing a second link being second mm wave radio communication link to a second access point further supporting the data session, the second wireless modem being located on the vehicle and employing a second electronically steerable beamforming directional antenna having a second main beam for establishing the second mm wave radio communication link; a common network element located on the vehicle and arranged to support communication for the data session over both the first mm wave radio communication link and the second mm wave radio communication link; and the method comprising: dynamically switching between the first mm wave radio communication link and the second mm wave radio communication link for the data session; and transmitting from the vehicle an address resolution message to the second access point over the second mm wave radio communication link for a switch from the first mm wave radio communication link to the second mm wave radio communication link; the address resolution message comprising identification data for the common network element.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
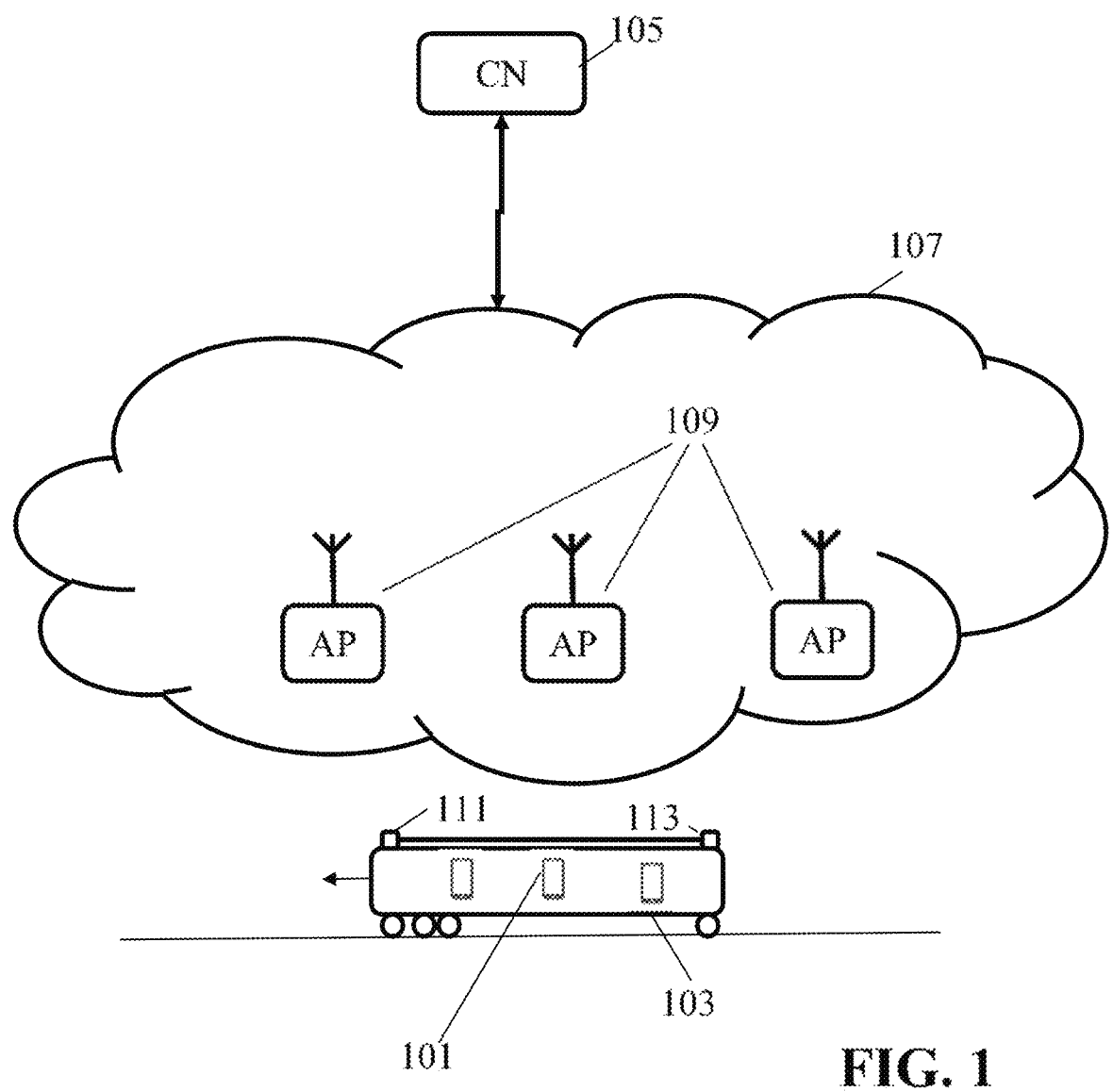
FIG. 1 illustrates an example of elements of a wireless communication system in accordance with some embodiments of the invention.

FIG. 1 illustrates an example of elements of a communication system which supports communication with end nodes that are located in moving vehicles, and in particular in fast moving vehicles such as cars, boats, buses, and trains. The following description will focus on an example in which the vehicle is a train, but it will be appreciated that in other embodiments the end node may be part of other vehicles, such as e.g. a bus driving on a motorway.

In the example of FIG. 1, a communication/data session is established between a correspondent node 105 and an end node 101 located in a train/vehicle 103. It will be appreciated that references to an entity being at/with/in/on etc. a vehicle includes any physical or logical form of the vehicle and entity being substantially co-moving, including the entity being positioned on, attached to, embedded within, etc. the vehicle. It will also be appreciated that it does not require the entity to be immovable with respect to the vehicle but rather it may include, for example, an entity being manually moved by a person (such as a person carrying a mobile device comprising the end node 101). An entity being in a vehicle may include all scenarios wherein the movement of the entity is at least partially dependent on the movement of the vehicle/where the movement of the vehicle imparts a movement on the entity.

The correspondent node 105 may be any communication node/service, and indeed may itself be a mobile node, or a node located in a vehicle. The following description will consider a scenario wherein the correspondent node 105 is a server supporting a corresponding client operating on the end node 101, and specifically a World Wide Web application will be considered where the correspondent node 105 is a web server supporting a web browser on the end node 101 accessing an Internet site supported by the web server of the corresponding node 105.

The communication/data session is supported by a fixed network 107 which may specifically be a complex network comprising routers, switches, management nodes, mobility controllers, modems etc. as will be known to the skilled person. In the example, the fixed network 107 is a Wide Area Network, WAN, based on the Internet Protocol (IP).

The correspondent node 105 is coupled to the fixed network 107 through a communication connection which supports the data session with the end node 101. The communication connection is in the example an IP connection and may be established using any suitable means, such as e.g. by a direct connection of a device comprising the correspondent node 105 to a node of the fixed network or e.g. it may be a connection which is provided by a network coupled to both the fixed network 107 and the corresponding node 105. The network may in particular be the Internet, and the coupling of the correspondent node 105 to the fixed network 107 may be via an Internet connection. It will also be appreciated that the fixed network 107 itself may be considered fully or partially part of the Internet.

The coupling of the fixed network 107 to nodes on the train 103 is supported by wireless radio communication links. For this purpose, the fixed network 107 comprises a plurality of wireless access points 109 which in the specific example may be a relatively large number of stationary access points positioned along the train tracks.

Correspondingly, the train/vehicle 103 comprises a plurality of wireless modems 111, 113 which are arranged to establish wireless (radio) communication links with the access points 109. The wireless modems 111, 113 are further arranged to establish one or more connections with the end node 101. The wireless modems 111, 113 are accordingly located at (in/on etc.) the train and are arranged to communicate with the access points 109 in order to provide an interface between the vehicle network nodes and entities (and specifically the end node 101) and the fixed network 107.

In the specific embodiment, the wireless radio links between the wireless modems 111, 113 and the access points 109 are formed using relatively high radio frequencies, and specifically mm wave radio communication is used. For example, the wireless links may be formed by radio communications using the 60 GHz frequency band. mm wave communications may specifically be communication in the 20 GHz to 300 GHz frequency range.

The wireless modems 111, 113 are individual nodes in the network configuration and have individual MAC addresses. Data packets can be addressed to the individual modems by other network entities, such as routers or switches, using the individual MAC addresses. A communication link is established from an access point 109 to a wireless modem 111 using the MAC addresses of the AP 109 and the modem 111, and similarly for a link to modem 113 but using the MAC address of modem 113. In the specific embodiment of using the IEEE 802.11ad wireless technology, the AP and the two modems would form a BSS (basic service set). In the specific embodiment of a 3GPP 5G NR radio technology the AP would be known as a base station (a sector of a gNB) and the modems would be known as UEs, with the three devices forming a cell. A scheduler may accordingly allocate data packets to an individual link by associating them with the appropriate MAC address.

Radio communications at higher frequencies tend to be more suited for shorter distances and using direct line of sight propagation. Directional beams are employed to increase the link distance, but the maximum distance for the wireless links tends to be relatively limited and each access point 109 will typically only cover a relatively short distance or interval. For example, for a 60 GHz system supporting a train, the coverage from each access points 109 may practically be restricted to e.g. around 300 m to 1 km from the access points 109. Accordingly, the distance between access points 109 will tend to be relatively small with the result that a relatively large number of access points 109 will be employed. For example, along a railway track, access points may be distributed for each, e.g. 500 m-1 km of track.

As a consequence, the radio conditions will tend to change quickly for the wireless modems 111, 113, and specifically the optimum access points 109 to which to connect tend to change quickly, e.g. for a train moving along train tracks at a potentially high speed. Furthermore, the directional radio beam of the wireless modems 111, 113 cannot necessarily be steered over all directions, but is limited to e.g. a 90 degree range in the horizontal (azimuth) plane. In order to support such scenarios, the system supports handovers between different access points 109 such that a connection from an end node 101 to the fixed network 107 (and the correspondent node 105) can be sequentially supported by different access points 109 and modems 111, 113 as the vehicle/train 103 moves. In order to maximize the separation of the access points, an individual modem can lose connectivity for significant periods of time (for example, it may only be connected to an AP for approximately half of the time), but the connectivity to the vehicle from at least one modem at any one point in time can be maintained.

It is desirable for such handovers to be seamless to the end node 101 such that the communication and the supported service is not interrupted. It is specifically desirable to establish new access point connections before terminating the previous ones (also known as make before break handovers).

However, supporting mobile communications, and, in particular, in situations where the wireless scenario experienced by the mobile unit changes quickly requiring many and frequent handovers, is a very difficult and challenging problem. The challenge tends to be exacerbated for communication systems and networks, such as IP networks, that are not originally designed to support such mobility.

The system of FIG. 1 is arranged to provide efficient and high-performance mobility support for end nodes of a vehicle, such as specifically for end nodes that are comprised in e.g. handheld devices of passengers on a fast moving train. The approach will be described in more detail with reference to FIG. 2 which shows an example of a specific scenario of FIG. 1 in which an end node 101 in a train 103 communicates with a correspondent node 105.

In the specific example, the correspondent node 105 is coupled to the fixed network 107 via a connection of the Internet 201 (it will be appreciated that the fixed network 107, as indeed the wireless modems 111, 113, may be considered fully or partially part of the Internet).

Figure 2:
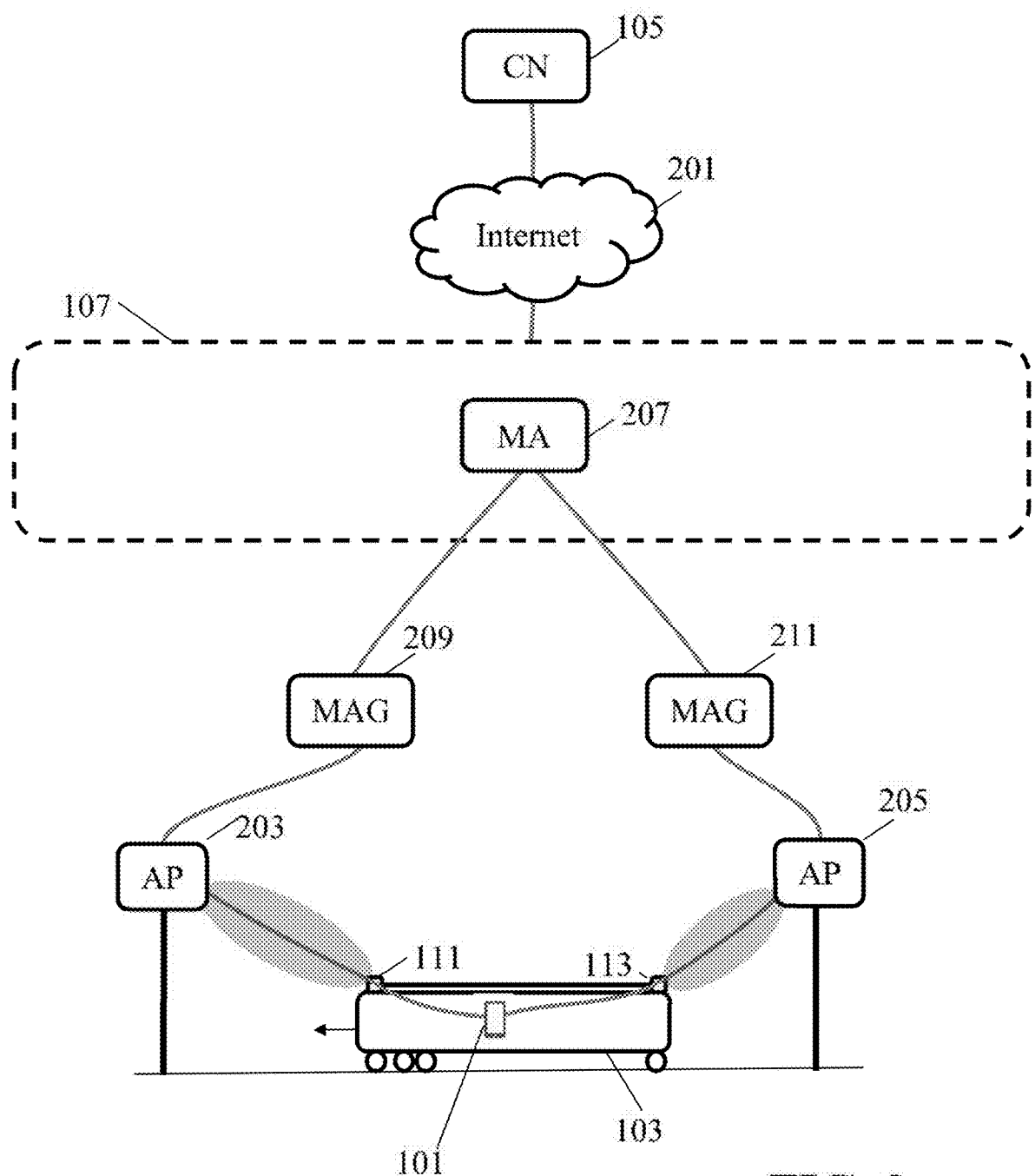
FIG. 2 illustrates an example of elements of a wireless communication system in accordance with some embodiments of the invention.

FIG. 2 illustrates a specific situation in which the train 103 has simultaneous access to a first access point 203 and a second access point 205 of the access points 109 via a pair of wireless modems of the wireless modems 111, 113. In the specific situation, one wireless modem 111 has established a wireless link with the first access point 203 and another wireless modem 113 has established a wireless link with the second access point 205.

The end node 101 and corresponding node 103 have established a data session which is supported by the fixed network 107. For example, the correspondent node 105 may operate a web server providing a web service to a client running on a device implementing the end node 101. As a specific example, a passenger on the train may operate a web browsing application which operates a web browsing client that initiates and supports a web service provided by the correspondent node 105.

The fixed network 107 provides connections that can be used by the client and the server. In order to support the mobility of the fast moving train, the fixed network 107 comprises a mobility anchor (MA) 207 which operates as a fixed anchor for the mobile nodes of the train 103. Specifically, the mobility anchor 207 operates as a common fixed anchor in the fixed network 107 for all the wireless modems 111, 113 of the train 103.

The mobility anchor 207 may provide a common node for all connections and communication paths from the correspondent node 105 to the end node 101 regardless of which of the access points 109 and wireless modems 111, 113 support the communication.

Accordingly, all data from the correspondent node 105 to the end node 101 for the data session may be routed via the mobility anchor 207 regardless of the wireless link that is used on the air interface between the access points 109 and the train. This may for example be achieved by the mobility anchor 207 advertising that it is a mobility anchor 207 for the wireless modems 111, 113 (or other nodes on the train 103) such that any datagrams addressed to any of these nodes will be routed to the mobility anchor 207.

Similarly, all data from the end node 101 to the correspondent node 105 for the data session may be routed via the mobility anchor 207 regardless of the wireless link that is used on the air interface between the access points 109 and the train 103.

The system may accordingly operate a mobility anchor functionality which provides a fixed anchor point for the mobile nodes of the train 103. The mobility anchor 207 will perform mobility management which includes keeping track of which access points 109 the wireless modems 111, 113 are currently connected to, and updating the routing path for the individual wireless modems 111, 113 and the end node 101 when conditions change. Thus, when the train moves and the individual modems dynamically switch/handover to different access points 109, the mobility anchor 207 will register the resulting changes and update the communication path for the individual connection/flow.

In the example of FIG. 2, each of the access points 203, 205 is coupled to a Mobile Access Gateway 209, 211. Each Mobile Access Gateway 209, 211 is typically linked with a plurality but not all of the access points 203, 205.

The mobility anchor 207 is accordingly a common mobility anchor for a plurality of the wireless modems 111, 113 of the train 103, and typically for all of the wireless modems 111, 113.

In many practical systems, some or all of the access points 109 may be substantially colocated and coupled together through network entities that allow short routing paths between them.

Figure 3:
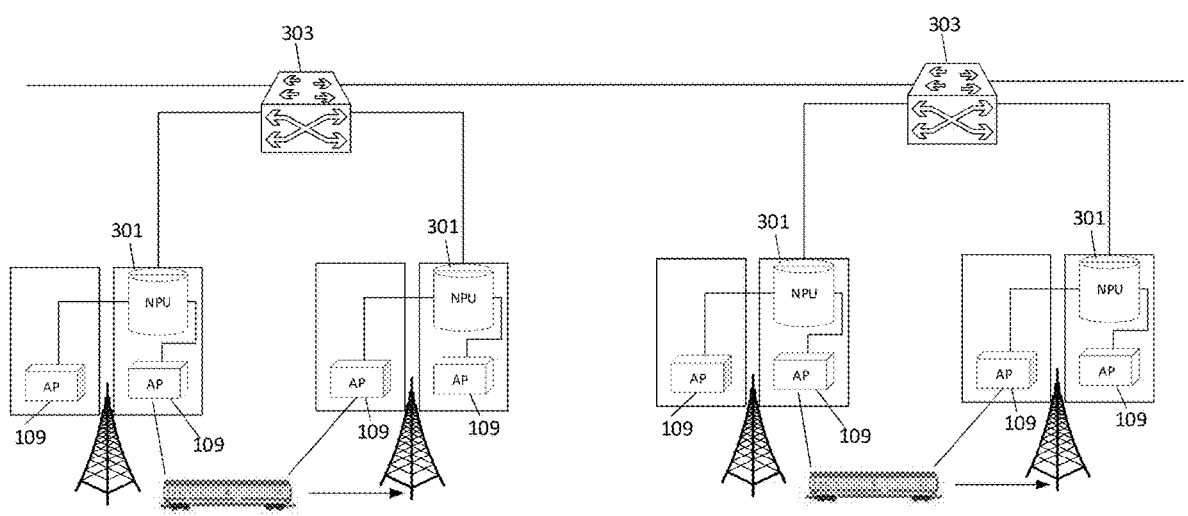
FIG. 3 illustrates an example of elements of a wireless communication system in accordance with some embodiments of the invention.

In many embodiments, such as e.g. illustrated by FIG. 3, two access points 109 may typically be colocated (e.g. on the same mast) with directional beams being used to provide coverage in different, and typically opposite directions. Thus, the access points 109 may comprise a directional antenna arrangement which forms directional beams to support the mm wave radio communications. In some embodiments, the directional antenna arrangement may be arranged to dynamically beam form and steer beams towards wireless modems on the vehicle, i.e. dynamic beam adaptation and steering may be employed. In other embodiments, the directional antenna arrangement may form static beams that are in a given, typical predetermined direction. For example, for access points next to a train track, a static beam in the direction along the track may be formed.

The colocated access points 109 may often be coupled to each other and the rest of the fixed network 107 by a suitable network entity, such as a Network Processing Unit (NPU 301). The NPU 301 may for example allow easy routing of data from one access point to another, and may control whether data packets are routed between the end node and the fixed network via one or the other of the colocated access points 109. In some embodiments, the NPU 301 may for example implement a Mobile Access Gateway (MAG) functionality in accordance with a Mobile IP approach.

Further, in many systems, the different access points 109 may be coupled together via switches or routers 303 that e.g. may provide a short and direct routing between access points 109 and NPUs 301. This may often facilitate routing and handovers when the vehicle moves as the required modification of routing can be reduced and localized to a higher degree. In some embodiments, the switches or routers 303 connecting the access points 109 may implement the MAG functionality.

The switches or routers 303 may further connect to the rest of the fixed networks, e.g. through interface routers/switches 305. Alternatively or additionally, MAG functionality may be implemented as part of the interface routers/switches 305.

Figure 4:
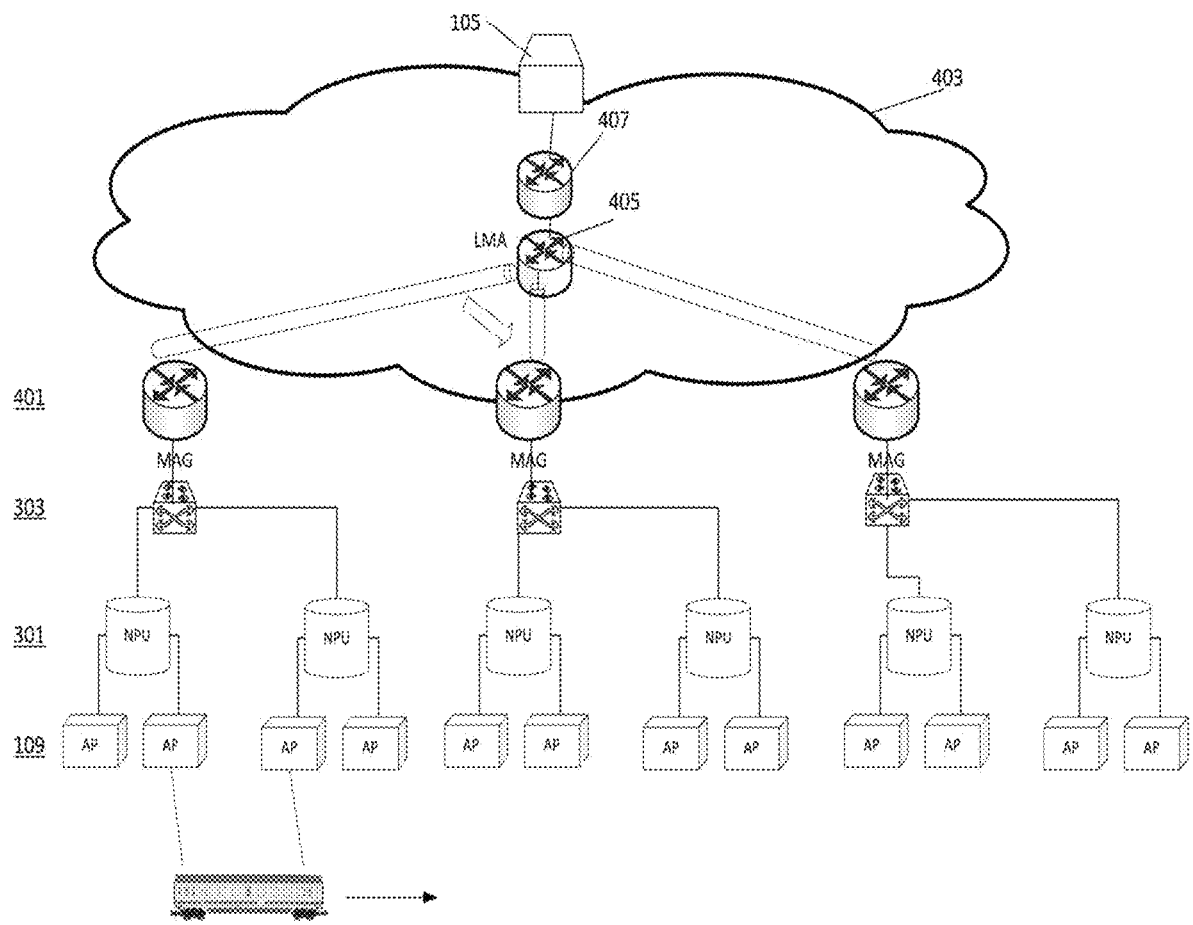
FIG. 4 illustrates an example of elements of a wireless communication system in accordance with some embodiments of the invention.

FIG. 4 illustrates a specific example of a possible network where pairs of access points 109 are colocated and supported by an NPU 301. A plurality of NPUs 301 may be coupled to a network switch 303 which may provide the MAG for that plurality of NPUs 301. Other network switches may support other access points 109 and provide a MAG for those access points 109.

In many embodiments, such a system of access points 109 and supporting network functions (e.g. switches and NPUs) may be proprietary and aimed at a specific scenario, such as supporting a train along a track. Such a proprietary system may accordingly provide a number of interface points with capability of providing a MAG function for the moving vehicle. The system may for example provide a proprietary access network that may be coupled to other networks via suitable interface connections.

For example, each of the interface points may be coupled to an edge router 401 of a core network 403 being part of the fixed network 107. The core network 403 may be a general non-proprietary network such as e.g. the Internet. In some embodiments, the MAG function may be provided in the edge router (or possibly another element of the core network). Another router 405 of the core network 403 may provide a MA (Mobility Anchor) function allowing routing of data to and from the MAG as appropriate. The correspondent node 105 may communicate with the MA through a suitable route, typically including a number of routers 407.

In such a system, different functions may be implemented in respectively the proprietary access network and the non-proprietary fixed network. For example, different mobility functions and support may be implemented.

Specifically, the mobility support may be implemented at different network layers and using different protocols. For example, intra MAG mobility may be implemented using layer 2 signaling such as L2 ARP (Data Link Layer—Address Resolution Protocol). This may provide fast and efficient handover between access points 109 under the same MAG, and specifically may allow handovers without requiring any change of routing in the core network (if the MAG is part of the access network).

In contrast, inter MAG mobility may be supported by a higher layer protocol such as for example an IP mobility protocol. Specifically, inter-MAG mobility may be supported by Proxy Mobile Internet Protocol v6 (PMIPv6). This allows the required routing changes in the core network 403 to be implemented efficiently.

Figure 5:
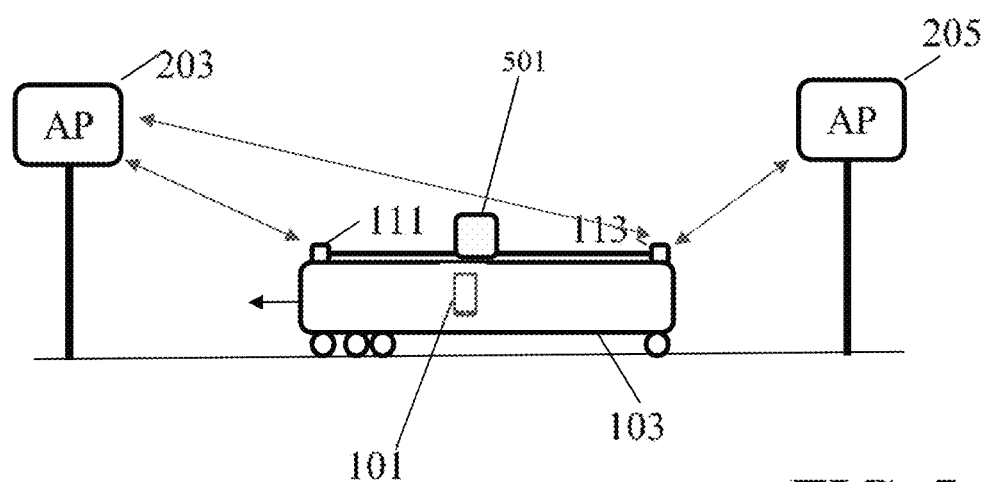
FIG. 5 illustrates an example of elements of a wireless communication system in accordance with some embodiments of the invention.

In some embodiments, the end node 101 may directly be connected to the wireless modems 111, 113 e.g. by a direct wireless link. However, in many embodiments, the wireless modems 111, 113 may as illustrated in FIG. 5 be coupled to a network element 501 or a network through which the connection with the end node 101 is formed.

Figure 6:
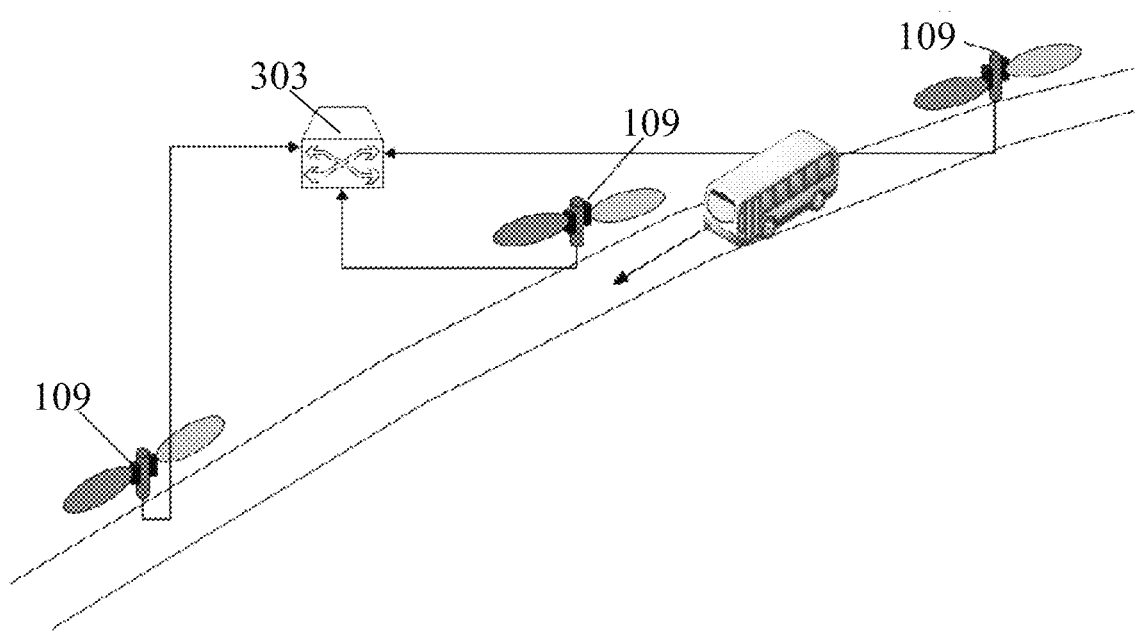
FIG. 6 illustrates an example of elements of a wireless communication system in accordance with some embodiments of the invention.

As previously mentioned, in many systems, the access points 109 may be arranged with a plurality of access points 109 being substantially colocated. For example, often pairs of access points 109 are colocated on a mast along the route covered. The access points 109 may use directional antenna arrangements to provide different coverage areas. For example, as illustrated in FIG. 6, two colocated access points 109 may have directional antenna beams that are substantially in opposite directions, and typically in different directions along the track being covered (e.g. in opposite directions of the track or road being covered).

Thus, some or all of the access points 109 may comprise directional antennas which are arranged to steer beams towards the wireless modems of the vehicle. In some embodiments, a static beam forming may be used with the beam formed being constant in a given direction. For example, one access point 109 may permanently direct a beam down a track and another colocated access point 109 may permanently direct a beam up the track in the other direction. A vehicle downstream from the position may then be connected via a wireless link with the first access point 109 and a vehicle upstream from the position may then be connected via a wireless link with the second access point 109.

In many embodiments, the access points 109 may be arranged to dynamically and electronically steer the beams, and specifically may be arranged to steer them towards respectively the wireless modems. A beam may indeed by steered individually for each wireless link and may dynamically be updated to be directed towards the wireless modem supporting the link. The updating may for example be by updating antenna array coefficients in response to received parameters as well known in the art.

In the examples previously described, two wireless modems 111, 113 were used to establish links between the vehicle/train 103 and the fixed network 107. The two wireless modems 111, 113 are in the examples positioned towards opposite ends of the vehicle/train 103. In some embodiments, the vehicle/train 103 may comprise more wireless modems and in particular it may in many embodiments be advantageous to have a plurality colocated wireless modems. This may specifically be advantageous if the colocated modems are arranged to form beams in different directions and/or freely/separately/independently of each other.

In particular, in many embodiments, rather than having a single wireless modem towards the front of the vehicle/train, there may be two wireless modems forming beams respectively in the forwards and in the backwards direction. Similarly, rather than having a single wireless modem towards the back of the vehicle/train, there may be two wireless modems forming beams respectively in the forwards and in the backwards direction. Thus, in such an example, there may be four links available such as e.g. often two links from respectively the front and the back of the vehicle/train pointing towards an access point ahead of the vehicle/train and two links from respectively the front and the back of the vehicle/train pointing towards an access point behind the vehicle/train. In some systems, there may be implemented a scheduling function which freely and dynamically can allocate data over the four different air interface links thereby allowing these to be fully optimized.

However, for practical reasons, it may often be desirable to reduce the number of individual links. For example, a system employing two wireless modems may be upgraded to use four wireless modems. However, some of the other equipment or functionality of the network may be based on only two wireless modems being present. In some systems, sets of wireless modems may be combined to appear as a single link to (some) other networks. For example, a common network element may provide a single common connection point for all wireless modems in a set. However, in such scenarios, it is a challenge to manage/adapt/update the network to provide the correct routing of data when e.g. changes in the links occur.

Figure 7:
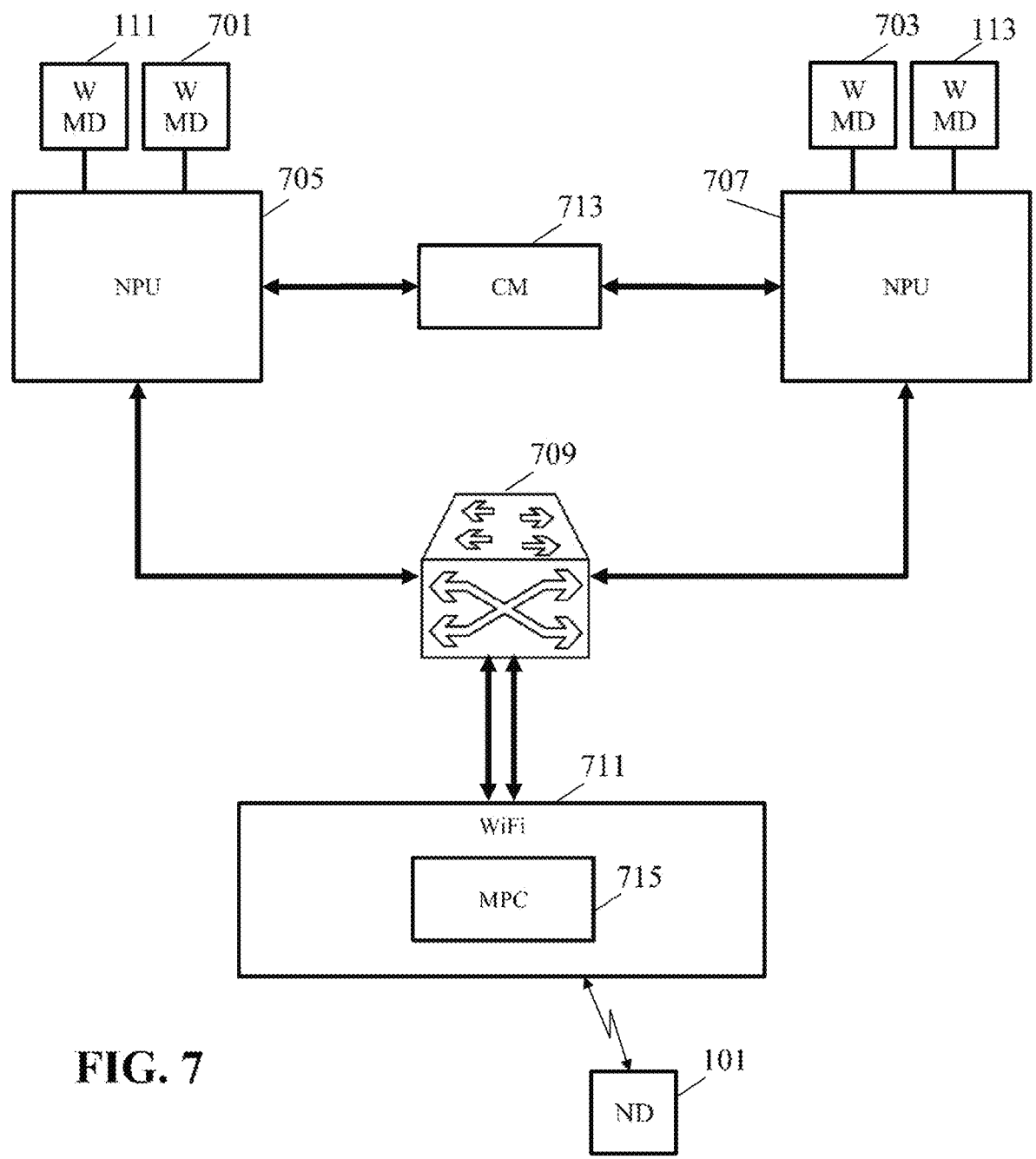
FIG. 7 illustrates an example of elements of a vehicle based network subsystem of a wireless communication system in accordance with some embodiments of the invention.

FIG. 7 illustrates an example where a moving vehicle may comprise four wireless modems 111, 113, 701, 703 being arranged into colocated pairs with one pair of colocated wireless modems 111, 701 being towards the front of the vehicle and the other pair of colocated wireless modems 113, 703 being located towards the rear of the vehicle.

The first pair of wireless modems 111, 701 are coupled to a first NPU 705 and the second pair of wireless modems 113, 703 are coupled to a second NPU 707. The NPUs 705, 707 are coupled to a switch 709 which is further coupled to a Wi-Fi subsystem 711. The NPUs 705, 707 and WiFi subsystem 711 may specifically be coupled to the switch 709 via Ethernet connections and the switch 709 may be an Ethernet switch. The WiFi subsystem 711 may e.g. provide wireless WiFi access throughout the vehicle, such as throughout a train, and may itself comprise WiFi access points, routers etc. Thus, a user of the end node 101 may simply connect to a local WiFi subsystem 711 (and specifically a conventional WiFi access point) to access the core network and the correspondent node 105. The WiFi subsystem 711 may for example be a conventional WiFi system such as an IEEE 802ac (or earlier) system. Thus, a user on a moving vehicle, such as a train, may simply access a conventional local WiFi access point to gain Internet access.

In the system of FIG. 7, the first NPU 705 is a common network element for the first pair of colocated wireless modems 111, 701 and the second NPU 707 is a common network element for the second pair of colocated wireless modems 113, 703. Thus, the first NPU 705 is a common network element 705 for first and second mm wave radio communication links and the second NPU 707 is a common network element 707 for third and fourth mm wave radio communication links.

A common network element for a plurality of wireless modems may thus be arranged to support communication between the end node and the remote node via (any) one of the wireless modems. A common network element for two or more mm wave radio communication links may be a network element through which data of data session is routed regardless of which of the mm wave radio communication links it is transmitted over.

In many embodiments, the IP address for the common network element is a common IP (gateway) address used for routing between the end node 105 and the correspondent node 105 regardless of which mm wave radio communication link is used for the communication via the common network element.

In one embodiment, the common network element can be a bridge between the wired interface to the NPU/common network element and the wireless interfaces.

In the system described, the wireless modems employ electronically steerable beamforming directional antenna that form a beam, and more specifically that form a directional pattern having a main beam that can be steered. Further, in the example two colocated wireless modems may employ directional antennas that may form a beams in different directions, such as e.g. in a forwards direction or range of directions and a backwards direction or range of directions respectively.

E.g., in the example of FIG. 7, the two co-located wireless modems 111, 701 may employ electronically steerable beamforming directional antennas that are directed in substantially opposite directions, specifically in the direction of movement and in the opposite direction of movement, specifically one directional antenna may be directed in the forwards direction of the vehicle and the other being pointed in the backwards direction of movement. Similarly, the other two co-located modems 113, 703 may employ directional antennas that are also directed in opposite directions, specifically in the direction of movement and in the opposite direction (forward/backwards). This may result in two wireless modems 111, 703 having beams formed generally in the forward direction (direction of movement) and two modems 113, 701 having beams formed generally in the backward direction.

Thus, the different pairs/sets of colocated wireless modems may each comprise a wireless modem arranged to form a beam in substantially the same direction as a wireless modem of another pair/set of colocated wireless modems.

In many embodiments, the wireless modems may comprise a beam adapter which is arranged to adaptively steer the main beam of the electronically steerable beamforming directional antenna towards the access point. It will be appreciated that many different approaches and algorithms are known for steering a beam towards a desired transmitter and/or receiver and that any suitable approach may be used.

For example, the wireless modems may comprise an electronically steerable beamforming directional antenna in the form of an antenna array for forming a main directional beam and the wireless modems may comprise a beam adapter which dynamically is arranged to adapt the individual antenna coefficients to direct the main beam towards the relevant access points, e.g. by applying a beam steering algorithm maximizing the received signal strength or signal to noise ratio as well known in the art. As another example, more mechanical solutions may be used. For example, horn antenna being electronically steerable using a stepper motor with electronic control may be used.

For two wireless modems connected to the same access point, such a steering may automatically and inherently result in the beams being formed in substantially the same direction for at least most locations. Specifically, when the distance between the wireless modems is small compared to the distance to the access point (say at least 5 or 10 times lower), the directions are inherently in substantially in the same direction. This will in most applications be the case for the majority of locations of the vehicle. The beam forming of two wireless modems towards the same point (and specifically access point) will be in substantially the same direction for a distance to the vehicle being at least 5 or 10 times greater than a distance between the wireless modems.

Thus, such an adaptive steering may not only result in improved link quality for the individual link as the beam may be dynamically optimized, but may also inherently ensure that the beams of the different wireless modems are formed in substantially the same direction, and specifically are formed towards the same access point, for most locations of the vehicle.

The wireless modems having beams pointing in the same direction may be suitable for forming wireless links with the same access point 109. For example, the two wireless modems having beams pointing in the forwards direction may both be suitable for establishing a wireless link with an access point 109 further ahead along the route/track. Similarly, the two wireless modems having beams pointing in the backwards direction may both be suitable for establishing a wireless link with an access point 109 being further backwards along the tracks.

Figure 8:
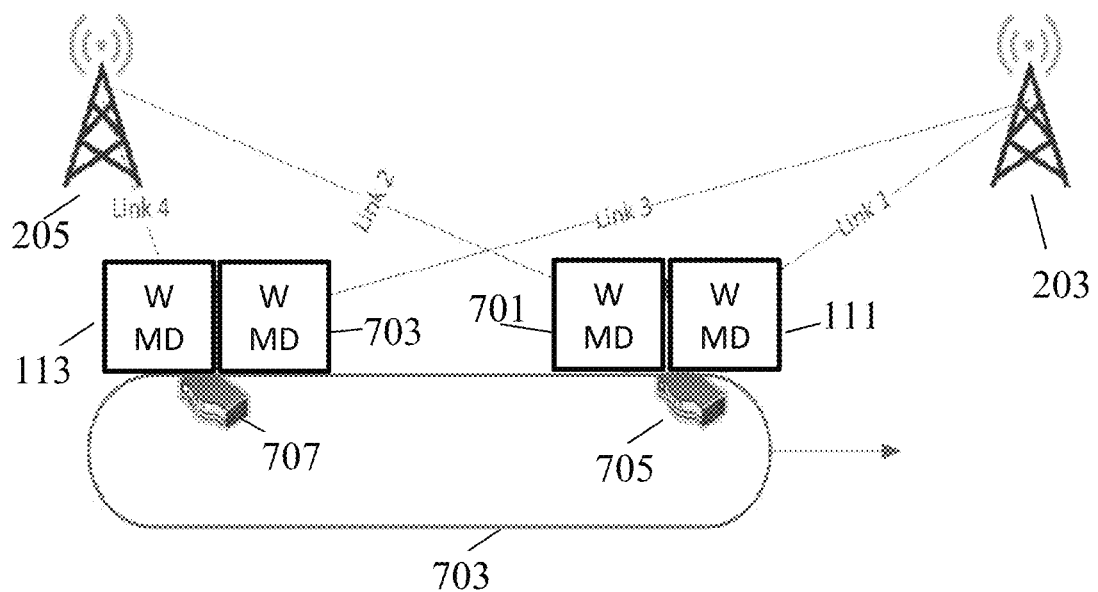
FIG. 8 illustrates an example of elements of a wireless communication system in accordance with some embodiments of the invention.
Figure 9:
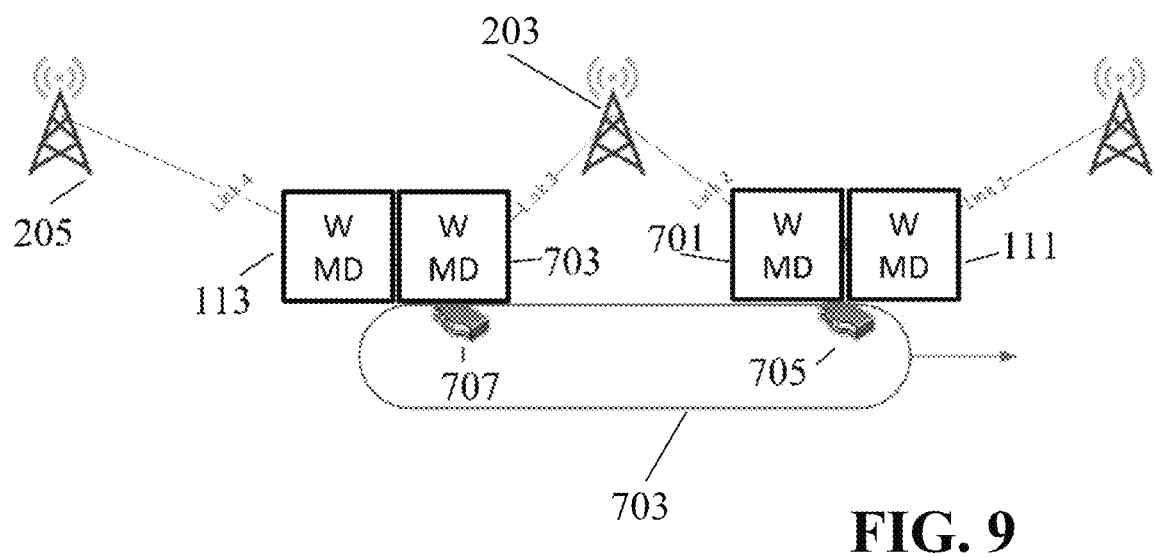
FIG. 9 illustrates an example of elements of a wireless communication system in accordance with some embodiments of the invention.

Similarly, the beam steering may be towards an access point rearwards of the vehicle/train 103 and this may indeed be simultaneous with another of the colocated wireless modems steering a beam towards a forward access point. Thus, often a situation may occur where one set of colocated wireless modems have established links with respectively a forwards and rearwards access point and thus forms beams in substantially opposite directions. At the same time, the other set of colocated wireless modems may have established links with respectively a forwards and rearwards access point and thus also form beams in substantially opposite directions. Further, one pair of non-colocated wireless modems may form beams towards the forwards access point and thus substantially in the same forwards direction, and another pair of non-colocated wireless modems may form beams towards the rearward access point and thus substantially in the same rearwards direction. Such an example is shown in FIG. 8. The establishment of a link may mean that the modem is associated to an access point. The link is available for sending data in either direction. FIG. 9 illustrates an example where the four wireless modems 111, 113, 701, 703 have formed simultaneous links with four different access points.

Thus, the vehicle, such as a train or a bus, may comprise sets of wireless modems that may be reached through a common network element, and specifically via a single common connection point of the common network element. The examples of FIGS. 7, 8 and 9 employs two pairs of such modems. Typically, the modems that can be reached through a single common connection point and the common network element are substantially co-located and the modems of such a set will for brevity be referred to as co-located modems. However, it will be appreciated that it is not essential for such modems to be co-located.

The vehicle may typically comprise a plurality of such sets of wireless modems. In many embodiments, the sets may be positioned at some distance to each other, such as specifically towards opposite ends of the vehicle. In many embodiments, different wireless modems in different sets may be arranged to form beams in corresponding directions. For example, each set may comprise one wireless modem facing in the forwards direction and one wireless modem facing in the backwards direction. In such scenarios, wireless modems in different sets being arranged to form beams in corresponding directions will be referred to as aligned wireless modems.

The approach may in particular allow each set of co-located wireless modems to form mm wave radio communication links to different access points and may also allow different sets of co-located wireless modems to form links to the same access point. For example, in FIGS. 7 and 8, wireless modem 111 and aligned wireless modem 703 are arranged to establish mm wave radio communication links to the same access point 203. This may provide more efficient communication over the radio air interface in many embodiments and may allow a fast and efficient adaptation to the current radio conditions. This is particularly significant for mm wave radio communication for moving vehicles as the conditions for individual links may change exceedingly quickly and substantially. The approach may provide additional air interface diversity which can increase overall throughput.

Thus, for brevity, conciseness and clarity, modems having the beams formed in substantially the same direction will be referred to as aligned wireless modems and the description will focus on a vehicle comprising a pair of aligned wireless modems having forward facing beams and a pair of aligned modems having rearward facing beams. Beams and radio communication links from different wireless modems to the same access point will also be referred to as aligned beams and aligned radio communication links. Similarly, for colocated modems, the beams and radio communication links will also be referred to as co-located beams and radio communication links.

Aligned wireless modems will typically be at a distance with respect to each other. In many embodiments, the distance between at least two aligned wireless modems of the vehicle will be no less than 5 m, 10 m, 20 m, 50 m, or even 100 m. In many embodiments, at least two aligned wireless modems will be disposed towards opposite ends of the vehicle, for example at the front and back of a bus or on respectively the first and last carriage of a train. Thus, at least two aligned wireless modems will be positioned proximal to opposite ends of the vehicle.

In many embodiments, the distance between at least two aligned wireless modems may be no less than 5, 10, or 100 times greater than a distance from each of the two aligned wireless modems to the nearest of the front and of the back of the vehicle. Thus, in many embodiments, the distance between at least two aligned wireless modems may be no less than 5, 10, or 100 times greater than a distance from the front of the vehicle to the nearest of the two aligned wireless modems. Similarly, in many embodiments, the distance between at least two aligned wireless modems may be no less than 5, 10, or 100 times higher than a distance from the back of the vehicle to the nearest of the two aligned wireless modems.

In contrast to the aligned wireless modems, non-aligned wireless modems may often be positioned close to each other and specifically may typically be positioned such that a pair (or set) of non-aligned aligned wireless modems are substantially co-located. For example, in the specific embodiment described, a pair of forward facing aligned wireless modems are positioned at respectively the front and back of the vehicle, and similarly a pair of rearward facing aligned wireless modems are positioned at respectively the front and back of the vehicle. Further, the forward and backwards facing wireless modems at the front of the vehicle may be substantially co-located, and the forward and rearward facing wireless modems at the rear of the vehicle may be substantially co-located. This colocation may facilitate operation and specifically allow shared network functionality, such as e.g. the colocated non-aligned wireless modems sharing a common NPU for coupling to e.g. an Ethernet switch.

The aligned wireless modems are accordingly at a substantial distance to each other. As the beams are in the same direction, all aligned modems may potentially connect to the same access point and thus multiple wireless communication links may be set up from the vehicle/train to a given access point. Further, due to the distance between the aligned wireless modems, the properties of the wireless links will typically be substantially different and will vary in different ways. Indeed, even in scenarios where the average propagation characteristics to different aligned wireless modems is substantially the same (e.g. the vehicle is far from the access point), the instantaneous conditions may be very different and vary in a typically independent and substantially uncorrelated way. The performance of the individual links will differ because of difference in path loss and fading (fast fading or shadowing) and radio and antenna performance.

In the described system, multiple simultaneous mm wave radio communication links may be set up with associated wireless modems and a data flow to a specific end node 101 on the vehicle may be able to use such multiple simultaneous mm wave radio communication links.

In the system, the common network elements/NPUs for the colocated sets (specifically pairs) of wireless modems are arranged to dynamically switch between the wireless modems and thus mm wave radio communication links supported by the common network elements. Specifically, the common network elements 705, 707 may be arranged to switch between wireless modems/mm wave radio communication links during a data session for the end node 105.

The switching between different mm wave radio communication links is by selecting one of the mm wave radio communication links for over the air interface communication of data of the data session. Thus, the switching is such that only one of the mm wave radio communication links is used for over the air data communication at a time. In other words, the switching between two mm wave radio communication links is such that one of the two links is selected as active and the other is selected as inactive.

The mm wave radio communication links being switched between are established mm wave radio communication links that have already been setup between the wireless modems and one or more access points. Accordingly, the mm wave radio communication links are available for communicating data of the data session. Each mm wave radio communication link is an established communication link between a wireless modem and an access point. Each mm wave radio communication link is ready for communicating data over the air interface. However, the switching is such that only one of the established mm wave radio communication links is used at a time, and the switching selects one out of the established mm wave radio communication links as an active link for communication of data of the data session. A radio link that is established corresponds to an association existing between the modem and an access point.

Furthermore, typically the common network elements 705, 707 may provide a common connection point that does not depend on which wireless modem/mm wave radio communication link is currently selected. Indeed, switching between the different mm wave radio communication links may be performed without requiring any changes in routing etc. to be made on the vehicle side of the common network elements 705, 707, and indeed the switching of mm wave radio communication links may be invisible to the routing in the vehicle network.

Figure 10:
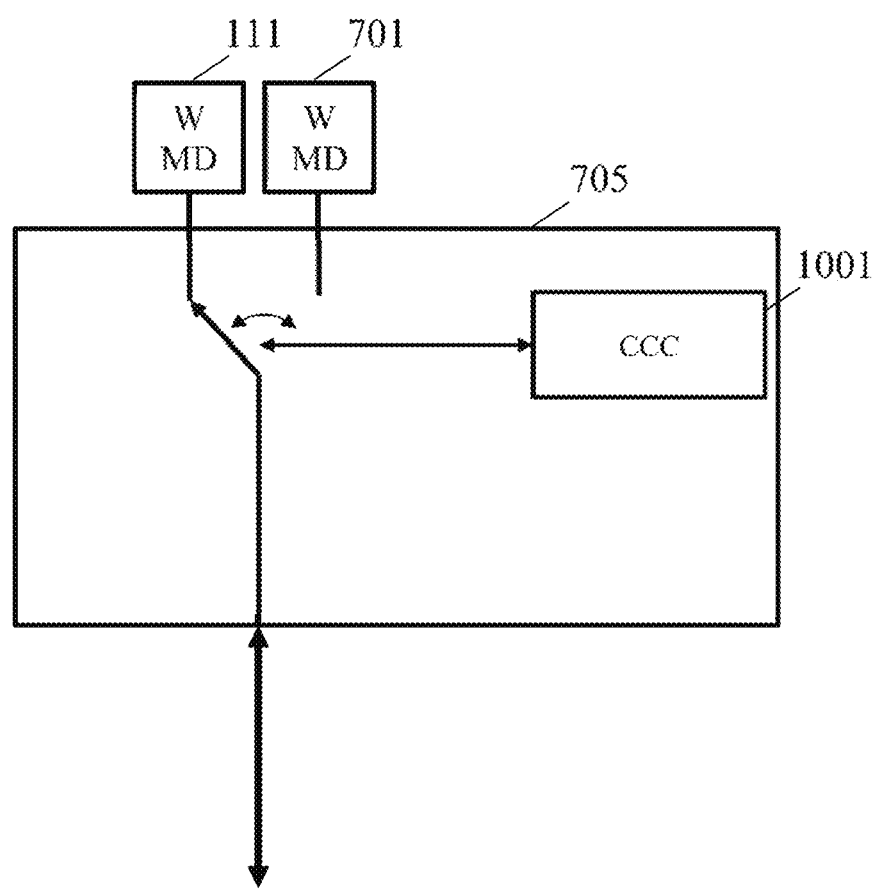
FIG. 10 illustrates an example of a common network element for a wireless communication system in accordance with some embodiments of the invention.

As illustrated in FIG. 10, the common network element/NPU 705 may provide a single connection point for a data session from the end node 105, and specifically may provide a single wired connection point for the data session. The single connection point is common for both the first and the second wireless modems 111, 701 and thus for the first and second mm wave radio communication links and thus the data communication for the data session that utilizes either the first mm wave radio communication link or the second mm wave radio communication link will also be via the single connection point.

In this system, when the common network element 705 switches from the first wireless modem 111 to the second co-located wireless modem 701, or from the second co-located wireless modem 701 to the first wireless modem 111, then this is done internally in the first common network element 705 by switching the coupling between the ports/interfaces to which the wireless modems are connected and the single wired connection point. Thus, no change is seen from the vehicle based network and no change in routing is needed.

The single wired connection point may specifically be a single port, and specifically a single Ethernet port, to which the rest of the vehicle network is connected. Thus, any data of the data session for the first and/or second mm wave radio communication links will be via the single port.

The single wired connection point may be a common connection point for the data session for both uplink and downlink data, i.e. both for data to the end node 105 from the correspondent node 105 as well as for data from the correspondent node 105 to the end node 105. However, in some embodiments, it will be appreciated that the single wired connection point may be a common connection point only for uplink or downlink data, i.e. it may be a common connection point for only one direction.

The common network element may comprise a connection control circuit 1001 which is arranged to dynamically switch between the first and second mm wave radio communication links. The switching in the common network element may for example be achieved by changing a forwarding or routing table in the common network element, or by hiding or disabling one of the two interfaces to the wireless modems from the data plane. Switching is also required in the fixed network as described below. The connection control circuit 1001 may include switch functionality for directly performing the switching and rerouting of data or may in some embodiments be arranged to switch by controlling an external switch. Thus, the switch illustrated in FIG. 10 may be considered to be part of the connection control circuit 1001.

In many embodiments, the connection control circuit 1001 may further be arranged to select between the first and second mm wave radio communication links. Thus, the connection control circuit 1001 may not only implement the actual switching between the mm wave radio communication links but will also implement an algorithm to select between these.

The selection may specifically be based on radio link condition indications for the first link and the second link. For example, the wireless modems 111, 701 may continuously measure parameters of the air interface links and may generate an indication of the current quality of each of the first and second mm wave radio communication links.

Based on the radio link condition indications, the connection control circuit 1001 may select whether the single wired connection point should be coupled to the first mm wave radio communication link or to the second mm wave radio communication link. If the radio link condition conditions for the first mm wave radio communication link and/or the second mm wave radio communication link meet a given switch criterion, the connection control circuit 1001 may proceed to switch from the currently selected mm wave radio communication link to the other.

It will be appreciated that different criteria may be used in different embodiments and that the specific criterion used in a given embodiment will depend on the specific preferences and requirements of the individual embodiment. Further examples and description will be described later.

The connection control circuit 1001 performing selection in the first common network element 705 may provide a number of advantages. It may allow fast selection and close integration between selection and switching. In particular, the wireless modems may provide radio links status indications to the first common network element 705 which allows selection algorithms to quickly evaluate the current conditions and to may allow the switching to closely follow variations in the conditions. Further, it may avoid delays associated with communicating relevant data to other entities which are responsible for the switching decision.

It will also be appreciated that the description provided with respect to the first common network element 705 and the first wireless modem 111 and second co-located wireless modem 701 may apply equally (mutatis mutandis) to the second common network element 707 and associated wireless modems.

The distributed and localized selection of wireless modems and mm wave radio communication links may provide advantageous performance in many embodiments. However, in other embodiments, selection may be performed in a separate network element. For example, as illustrated in FIG. 7, the first and second common network elements 705, 707 may be coupled to a common, remote, and/or link selection element 713 which may select between mm wave radio communication links. The link selection element 713 may receive radio link condition indications from the common network elements and may select mm wave radio communication links based on these values. It may then transmit the selections back to the common network elements 705, 707 which may proceed to perform the switching in accordance with the instructions.

In some such embodiments the link selection element 713 may perform separate and independent selection of mm wave radio communication links for each common network element. However, in many embodiments, improved performance may be achieved by performing a joint selection, for example in order to maximize the number of different access points that are used for the data session.

In the system, the common network elements 705, 707 provide a single wired connection point to the vehicle network for both (possibly all) mm wave radio communication links supported by the common network element for the data session. The vehicle network thus can operate continuously and without considering the specific selected mm wave radio communication link, and indeed need not adapt or even consider any switching. Indeed, from a vehicle network based point of view, there may be no difference between an air interface approach as disclosed and a conventional approach of coupling directly to a single wireless modem with a single connection. The additional air interface links may thus by the common network element and the specific switching may effectively be hidden from the vehicle network. This may provide substantial advantages as it may allow the improved air interface diversity to be introduced to an existing system without requiring modifications. It may provide interoperability with many existing network elements and products and may provide improved backwards compatibility.

The described system may further provide an advantageous and efficient approach for adapting the fixed network side to the switching between mm wave radio communication links.

The system is arranged to transmit an address resolution message over the air interface when it switches between mm wave radio communication links. The address resolution message is transmitted on the mm wave radio communication link to which the connection control circuit 1001 is switching.

Thus, specifically, the connection control circuit 1001 may be arranged to transmit an address resolution message over the second mm wave radio communication link to the corresponding access point in response to, and typically following, a switch from the first mm wave radio communication link to the second mm wave radio communication link. Similarly, the connection control circuit 1001 may be arranged to transmit an address resolution message over the first mm wave radio communication link to the corresponding access point in response to, and typically following, a switch from the second mm wave radio communication link to the first mm wave radio communication link.

The address resolution message is accordingly transmitted over the new mm wave radio communication link and to the new access point, i.e. over the mm wave radio communication link and to the access point to which the connection control circuit 1001 switches. Accordingly, an access point receiving such an address resolution message will be informed that the supporting/active mm wave radio communication link has changed and that the currently supporting/active mm wave radio communication link/wireless modem that should now be used is the one from which the message is received.

Further, the address resolution message comprises identification data for the common network element that supports the communication for the data session over both the first mm wave radio communication link and the second mm wave radio communication link. Thus, the address resolution message includes identification data which may specifically include an address for the first common network element 705.

An access point receiving an address resolution message can accordingly conclude that any data packets addressed to the first common network element 705 should be routed to that access point and should be transmitted to the first common network element 705 using the mm wave radio communication link over which the address resolution message is received. Accordingly, the fixed network can adapt the routing such that data packets for the end node 105 are routed to this access point and the access point can transmit these over the new mm wave radio communication link. Correspondingly, for the uplink path, data packets of the data session received on the new radio communication link can be forwarded as appropriate based upon the address information within the packets.

The approach thus utilizes an address resolution message to adapt the routing/operation of the fixed network when a switch occurs for the mm wave radio communication link being used. The approach is based on the air interface address resolution message providing the relevant information partly by virtue of the mm wave radio communication link on which it is received (the new mm wave radio communication link) and partly on identification data for the common network element. Thus, specifically, the common network element may be an address that can be associated with the data session (and which indicates which data session to update routing for). The link to use over the air interface is determined based on which mm wave radio communication link the address resolution message is received.

An address resolution message is a message which carries the identity of the sender, for example, the IP address and a layer 2 or MAC address which can be used for forwarding packets to the sender within the layer 2 domain to which the device is a member. The message can also carry a destination addresses. If the message is to be broadcast from the access point to other nodes (such as switches), a broadcast address can be included.

In many embodiments the identification data for the common network element may be any data that allows the common network element to be fully or partly identified. The identification data may specifically comprise address data for the common network element.

Specifically, in many embodiments, the identification data may comprise an IP address for the common network element. The IP address may allow a global identification of the common network element and thus provide a suitable basis for other network elements to identify the paths/routes that may be affected by the switching operation.

In many embodiments, the identification data may advantageously additionally or alternatively include an indication of a MAC address for the interface of the common network element which is used for the data session. It may specifically be a MAC address for the single wired connection point. The MAC address is used to allow a layer 2 forwarding to the common network element. The MAC address is required for packets sent over the Layer 2 domain to which the access points may typically be connected. The MAC address in the address resolution message is the same irrespective of which modem has been chosen to send/receive data. This e.g. differs from the behavior when a host device swops network interface cards and signals a new MAC address for the same IP address. An advantage of using a single MAC address in the message is that any downlink packets that are in transit towards the access point to which the data flow is originally being sent can be switched to follow a new path to the new access point since they already hold the correct MAC address. Any downlink packets that are queued at the first access point may in principle be passed to the neighboring switch and then forwarded on to the new access point since the forwarding tables in the Layer 2 domain will have been correctly adjusted for the MAC address.

In many embodiments, the address resolution message is a Gratuitous Address Resolution Protocol, GARP, message. A GARP message is a specific Address Resolution Protocol message as defined in the IETF RFC826 specification.

A GARP message may be used to provide unsolicited information to network elements that may be used by these network elements to change the routing and update routing paths through the network. A GARP message may specifically comprise a source IP address of the originating network node and in the present case, the GARP may accordingly be arranged to comprise the IP address of the common network element. The destination IP address is also set to the IP address of the common network element because the GARP message is to be broadcast over the Layer 2 domain of which the APs are part. The GARP message may further include a source MAC address which is indicative of the interface of the common network element that couples to the end node (105). Thus, the MAC address may specifically be a MAC address of the single wired connection point of the common network element. The GARP uses a broadcast destination MAC address ff:ff:ff:ff:ff:ff.

A GARP message may specifically be used to result in updates of the ARP (Address Resolution Protocol) tables of a network element, such as a switch, receiving the GARP message. The GARP message is broadcast over the Layer 2 domain, such that each switch can understand to which port it should forward traffic addressed to the MAC address of the common network element, based upon the port on which the GARP message arrived.

For example, in some scenarios, the first and second mm wave radio communication links may be established to a common access point, i.e. the first and second mm wave radio communication link may be to the same access point. Thus, in some scenarios and embodiments, it may be that both the first wireless modem 111 and the second co-located wireless modem 701 have established links to the same access point.

In such a case, the access point may maintain both mm wave radio communication links as available but with only one being used for data transmission at a time. The access point may accordingly store an association between the IP address of the first common network element 705 and/or a MAC address of the single wired connection point and the currently active mm wave radio communication link, e.g. represented by the MAC address of the corresponding wireless modem. If an address resolution message, such as specifically a GARP message, is received on the other mm wave radio communication link, it may cause the access point to change the association of the address of the first common network element 705 and/or a MAC address of the single wired connection point to be with the this other mm wave radio communication link, e.g. by linking the addresses of the first common network element 705 to the MAC address of the corresponding wireless modem.

The access point may thus maintain data indicating a forwarding path for the data session. This may at a given point for example associate the data session with the first mm wave radio communication link and the first wireless modem 111, and specifically may link the IP address of the first common network element 705 and/or the MAC address of the single wired connection point with the MAC address of the first wireless modem 111.

If the access point now detects that an address resolution message, and specifically a GARP message, is received on the second mm wave radio communication link from the second wireless modem 703, it may proceed to determine the source of this message. If it is detected that the identification data of the address resolution message corresponds to the IP address of the first common network element 705 and/or the MAC address of the single wired connection point, the access point can determine that it relates to the data session for the end node 105 and that the active mm wave radio communication link has changed from the first mm wave radio communication link to the second mm wave radio communication link.

Accordingly, the access point may proceed to modify the forwarding path for the data session from the first mm wave radio communication link to the second mm wave radio communication link, e.g. by replacing the MAC address for the first wireless modem by the MAC address for second wireless modem 703. Subsequently, any data packet received by the access point and addressed to the first common network element 705 and/or single wired connection point will then be transmitted to the second wireless modem 703 over the second mm wave radio communication link.

In most embodiments, an access point receiving an address resolution message will be arranged to transmit a routing update message into the fixed network.

Most typically, the first mm wave radio communication link and the second mm wave radio communication link will be links to different access points. For example, when there is a single pair of modems and a single common network element on the vehicle, the connection control circuit 1001 may switch between modems with beams in opposite directions, and therefore connected to different access points. In such circumstances, a switch between wireless modems may also result in a change of access point and the corresponding required routing update cannot be achieved internally in a single access point.

For example, a typical scenario will result in the connection control circuit 1001 for the common network element/wireless modems towards the front of the vehicle selecting the wireless modem forming beams towards an access point in front of the vehicle and the connection control circuit for the common network element/wireless modems towards the back of the vehicle selecting the wireless modem forming beams towards an access point behind the vehicle.

In such circumstances, a switch between wireless modems for one of the sets of wireless modems may also result in a change of access point and the routing update cannot be achieved internally in a single access point.

Therefore, in many embodiments, a routing update message may be transmitted to one or more network elements in the fixed network when a new address resolution message is received. The routing update message is indicative of the data session being linked to the access point receiving the address resolution message and transmitting the routing update message. The transmitted routing update message accordingly comprise an indication of an association between the new access point and the common network element (e.g. via an address for the common network element or for the single wired connection point) for the new mm wave radio communication link.

The routing update message may for example indicate the data session by comprising an indication of the common network element or single wired connection point for the mm wave radio communication links being switched between. The access point may typically be indicated by an address for the access point. In some embodiments, a separate and explicit field may be used to identify the access point but in many embodiments this may be more implicitly indicated by the source of the routing update message being the access point.

A network element receiving the routing update message may accordingly update its routing associations from pointing to the previous access point to pointing to the new access point. For example, it may change an association of the IP address of the common network element or the MAC address of the single wired connection point to the IP or MAC address of the previous access point to the IP or MAC address of the new access point. It may also update the mapping between the MAC address of the common network element and the outgoing port on which packets addressed to this address shall be forwarded.

In many embodiments, the access point may be able to broadcast the routing update message. Thus, in some embodiments, the access point may simply broadcast the message so that the message is widely distributed in the fixed network. This may often provide an efficient approach for adapting the network as a whole to the switching in which mm wave radio communication link is being used.

However, in some embodiments, the access point may additionally or alternatively be arranged to transmit (and specifically unicast) the routing update message to one or more specific network elements. For example, the access point may keep track of which network elements data packets addressed to the common network element are received from and transmit the routing update message directly to such network elements.

In many embodiments, the access point may be arranged to always transmit a routing update message when a new address resolution message is received. However, in other embodiments, the access point may be arranged not to broadcast a routing update message if the two mm wave radio communication links between which the switch occurs are supported by the same access point.

For example, when an address resolution message is received on a mm wave radio communication link, the access point may determine whether e.g. the address resolution message comprises an identification of a common network element for which another mm wave radio communication link is associated in its forwarding path table/ routing table. In this case, the access point may change the link in the forwarding path table to the MAC of the wireless modem from which the address resolution message is received. However, in this case, it may not transmit any routing update message. However, if no entry is found in the forwarding path table, the access point may generate and transmit a routing update message indicating the new path/link.

Specifically, the access point may be arranged to transmit a Proxy Mobile IP Binding Update message. This Binding Update message may specifically comprise the IP address of the common network element. The network element that receives the Binding Update message will accordingly update an IP tunnel to pass from the network element to the access point to route data packets via (the new access point). The network element that receives the Binding Update message is the Local Mobility Anchor, LMA, for the common network element. Such an approach may be particularly suitable for scenarios where the access point acts a MAG (Proxy Mobile IP) for the end node 105. Proxy Mobile IP may also be used when the MAG function is not located within the access point. In this case the common network element may switch the data path to an access point in the same Layer 2 domain as the MAG using the address resolution message. When it switches to an access point in an adjacent Layer 2 domain with a new MAG, then the new MAG will generate the Binding Update when it receives an address resolution message. The Binding Update then triggers a switch of an IP tunnel from the LMA to the new MAG.

A method using Mobile IP is also a viable solution to wide-area mobility. In this case the Binding Update message is generated by the common network element itself.

In many embodiments, the access point may be arranged to transmit the address resolution message in the fixed network. In some embodiments, the routing update message may be generated to directly correspond to the received address resolution message, i.e. data may be copied directly from the address resolution message to the routing update message.

Thus, in many embodiments, when an address resolution message is received, it is forwarded to one or more network elements in the fixed network. For example, it may be unicast to network elements identified as having transmitted data packets addressed to the common network element, or it may broadcast the address resolution message into the fixed network.

The approach may specifically be suitable for a scenario/embodiment in which the access point is connected to a layer 2 forwarding domain. The access point may receive a layer 2 address resolution message, such as a GARP, and proceed to transmit (specifically broadcast or unicast) the same address resolution message into the network, and specifically over a wired interface to the fixed network.

As a specific example, the access point may be arranged to receive a GARP message and broadcast this into the fixed network. The fixed network may in such cases adapt the routing to the new mm wave radio communication link by operating in accordance with the Address Resolution Protocol approach for responding to conventionally generated GARP messages. This may provide improved backwards compatibility and facilitate introduction of the air interface diversity into existing networks.

In some embodiments the common network element may comprise (or be) a network bridge. The network bridge may implement a bridge between the wireless modems and the wired interface of the common network element (which provides a connection to the vehicle network segment.

The bridge may thus provide the single wired connection point towards the vehicle network segment and may provide one connection point for each of the wireless modems. The bridge may provide a connection point for the data session to the vehicle network segment (also referred to as the southside) and may provide a connection point for the data session for each wireless modem.

In this case, the switching between the first and second mm wave radio communication links, and thus between the first and second wireless modems, may be by changing which northside port/connection point is bridged with the southside port/connection point, i.e. with the single wired connection point.

The bridge may accordingly provide a plurality of interfaces to which the wireless modems are connected, with each interface providing a single connection point with a separate MAC address. The different colocated wireless modems are coupled to different interfaces such that each interface is only linked with one wireless modem.

In such an example, the switching may be achieved by adding and removing interfaces of the bridge to which the wireless modems are connected. For example, a switch from the first mm wave radio communication link to the second mm wave radio communication link is achieved by removing the interface for the first wireless modem from the bridge and adding the interface for the second wireless modem to the bridge for the single wired connection point.

In such embodiments, the connection control circuit 1001 may accordingly select between the first and second mm wave radio communication links by activating one of the interfaces and deactivating the other interfaces to which a wireless modem is coupled.

An advantage of using network bridges as common network element functions is that it may provide a more practical implementation. Interface switching may be achieved with low complexity and low latency. The approach may allow reuse of existing functionality, e.g. by allowing low complexity adaptation of conventional bridging built into the network software (for example, the linux kernel) to be used for the specific implementation described. Furthermore, adding and removing interfaces from the bridge is faster than bringing the interfaces up or down.

The described system further comprises functionality for communicating between the correspondent node 105 and the end node 101 simultaneously using multiple paths through the network. However, rather than treating each of the wireless modems/mm wave radio communication link as a possible subflow path, the first and second wireless modems/mm wave radio communication links are by the first common network element 705 managed as a single subflow path, i.e. the single first single wired connection point provides one subflow path for the multipath operation.

In some embodiments, the second pair of colocated wireless modems, i.e. the third and fourth wireless modems 113, 703 may by the second common network element 707 be managed to provide a second possible multipath subflow, i.e. the second single wired connection point may provide a second possible multipath subflow.

The system may accordingly comprise a multipath controller 715 which is positioned on the vehicle, i.e. it is part of the vehicle network segment. The multipath controller 715 may be arranged to communicate data of the data session with a complementary multipath controller of the fixed network over a plurality of paths. The multipath controller 715 is in the example illustrated to be part of the WiFi subsystem 711 but it will be appreciated that it may be located in any suitable part of the vehicle network system.

In the system, the fixed network may accordingly comprise a multipath controller which interworks with the multipath controller 715 in the vehicle network to provide an overall data flow between the end node 101 and the correspondent node 105 with the flow between the multipath controllers using a plurality of paths/flows. The multipath controller in the fixed network is thus a complementary multipath controller with respect to the multipath controller 715 of the vehicle network as it interworks with this to provide an overall flow using subflows between the multipath controllers. The multipath controllers may be arranged to divide data for transmission over the plurality of paths/flows and to combine data received over the plurality of paths/flows.

The complementary multipath controller may be located at any suitable location and in any suitable network element of the fixed network. In many embodiments, it may be part of a LMA or MAG functionality.

In the system, the multipath controller 715 has a first wired port which is connected to the first single wired connection point. The multipath controller 715 is arranged to use this first wired port for one subflow/path of the plurality of paths used to support the data session. Thus, the first and second mm wave radio communication links do not individually correspond to subflows/paths but the combination of these does correspond to a subflow/path. Thus, the first single wired connection point may provide a single path to the multiflow operation and this path/subflow may itself be based on one of a plurality of subpaths over the air interface, namely the first mm wave radio communication link and the second mm wave radio communication link. However, this further subdivision and plurality of paths are not handled by the multipath controller 715 and indeed will typically be implemented independently, and typically without the knowledge, of the multipath controller 715.

In many embodiments, the multipath controller 715 may comprise a second wired port for a second path of the plurality of paths and this may be connected to the second single wired connection point. Thus, the second set of colocated wireless modems may together be used to form a second single subflow/path.

The approach may provide improved operation in many embodiments. It may allow a very efficient communication with high throughput and may in particular provide efficient adaptation to quickly changing radio conditions. The approach may accordingly be highly suitable for fast moving vehicles and mm wave radio communication. Further, it may achieve this while allowing complexity of the multipath controller to be kept low. It may in particular facilitate (re)use of existing or low complexity equipment and provide improved backwards compatibility. For example, efficient multipath utilization of four different mm wave radio communication links may be achieved using a low complexity existing multipath controller that only supports two paths/flows.

As a specific example, the approach may allow quick selection between matching mm wave radio communication links to be performed close to the wireless modems thereby reducing delays and allowing more relevant radio condition data to be taken into account for the decision. This may result in faster and better informed link switching which is particularly suitable for fast moving vehicles. This will result in higher throughput to the vehicle. At the same time efficient multipath operation can be performed using the combined path without requiring this to consider the low level switching.

In the system, data of the end to end flow between the correspondent node 105 and the end node 101 may thus be communicated over different paths including over multiple mm wave radio communication links as described above. In many embodiments, the end to end flow may be divided into a number of subflows which may then be communicated over the different paths.

In such systems, aggregator functions may be included to control the multipath subflows. Such an aggregation function may have two parts. For transmission, it may schedule packets. For the downlink direction, this may simply involve identifying which packets to send on which downlink link, i.e. on which multipath. For the uplink, the same function may be used, or it may just involve putting data into the appropriate queue. For example, in the described scenario a multipath controller 715/aggregator on the train may push packets towards the first wireless modem 111 or the second wireless modem 113 depending on the latest radio metrics, and specifically dependent on a link quality. Thus, typically, a multipath controller/aggregator includes a scheduling function for the transmission of data packets over subflows.

On the receiving side, a multipath controller may combine the received data packets into a single data stream for onwards transmission. The multipath controller may implement an aggregator function that typically includes a reordering of the received data packets and which may specifically operate a reordering queue to maintain in-sequence delivery. Thus, an in sequence single data flow may be generated where data packets are transmitted in the appropriate order.

Thus, in some embodiments, the multipath controller 715 may comprise an aggregator for aggregating data for the data session, the aggregating comprising aggregating data for at least a first aggregation port and a second aggregation port, the first aggregation port being connected to the first single wired connection point (and typically the second aggregation port being connected to the second single wired connection point).

In many embodiments, the system may thus include a fixed network multipath controller which is arranged to couple a connection for the correspondent node 105 to a plurality of subflows. On the vehicle there exists a corresponding multipath controller 715 providing a single connection from the multipath controller 715 to the end node 101. The multipath controllers may load balance packets out into multiple subflows between the multipath controllers.

Figure 11:
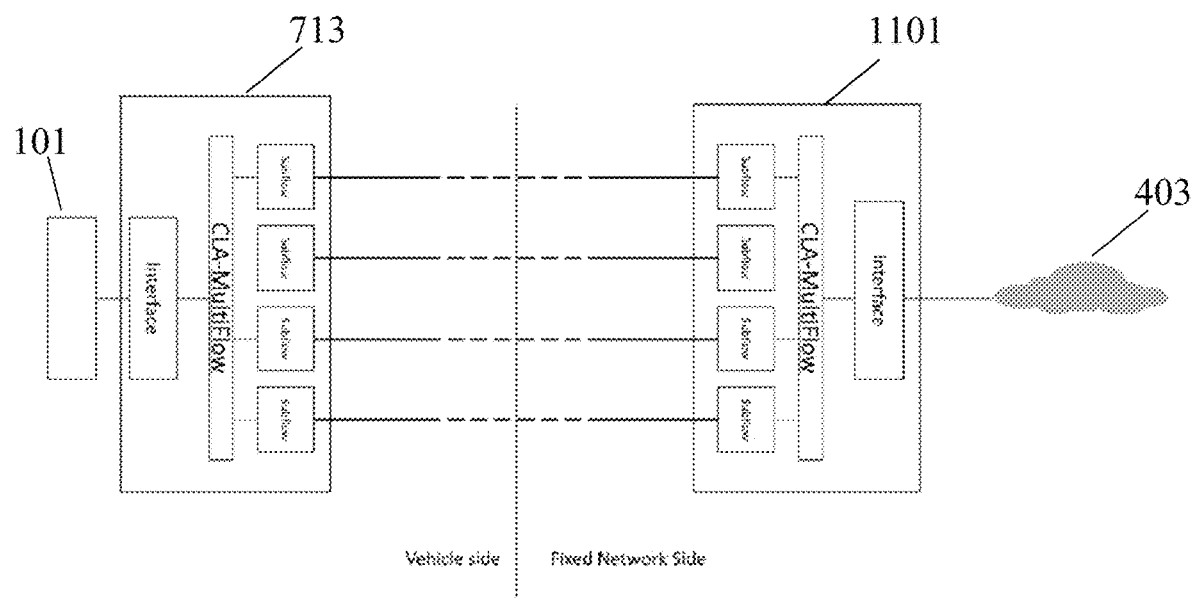
FIG. 11 illustrates an example of elements of a multipath arrangement for a wireless communication system in accordance with some embodiments of the invention.

FIG. 11 illustrates an example of a system of two multipath controllers utilizing subflows for communication. In the example, a multipath controller 715 may provide a single flow connection for the end node 101 and a fixed network multipath controller 1101 may provide a single flow connection for the fixed network. The connection between the two multipath controllers is by a plurality of subflows each of which may use a different path.

Figure 12:
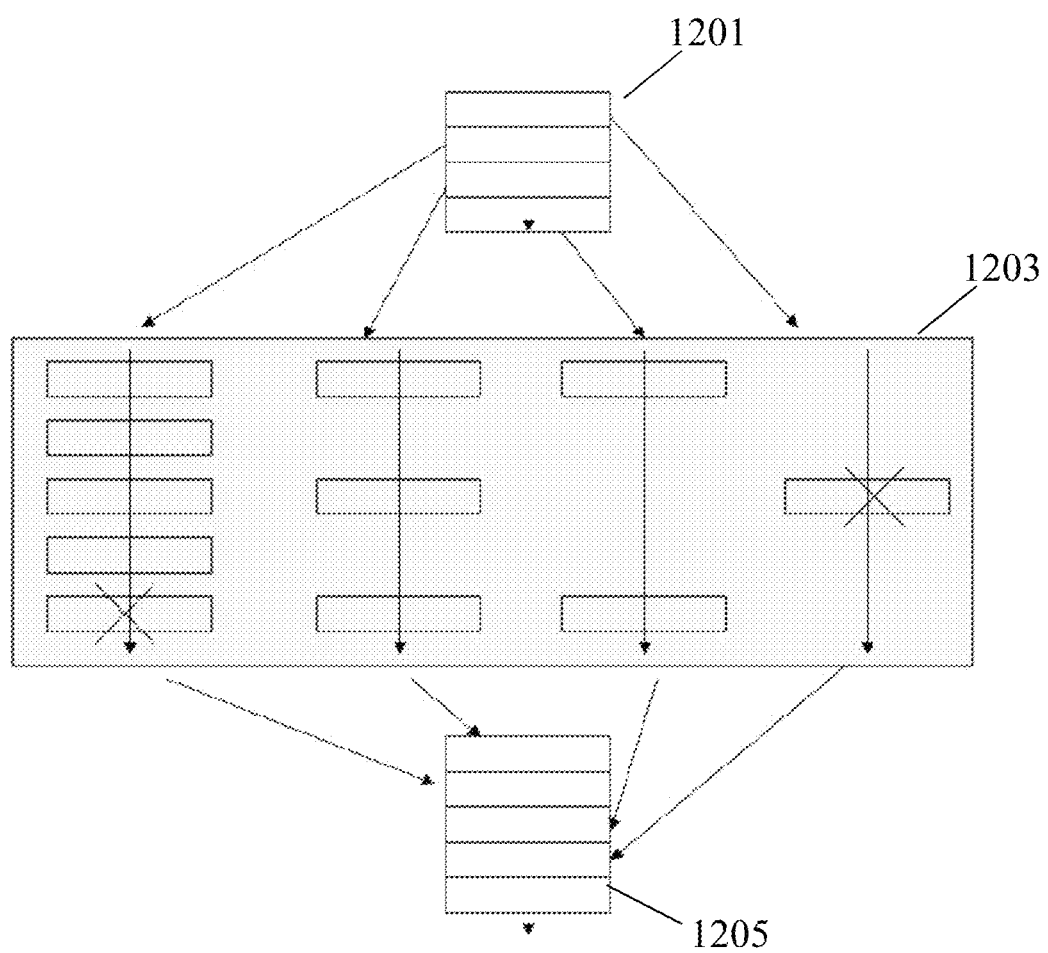
FIG. 12 illustrates an example of elements of operation of a multipath arrangement for a wireless communication system in accordance with some embodiments of the invention.

FIG. 12 illustrates an example of the operation of the multipath subflow communication. In the example, an input set of data packets 1201 are received in a given order. These may be routed via a plurality of subflows 1203 with data packets being distributed over the different subflows 1203. The subflows 1203 may then be combined into a single flow 1205, i.e. a single set of output data packets may be generated.

Due to different properties of the different subflows, the data packets may be received in a different order than in the input set of data packets 1201, and the receiving multipath controller may reorder the output data packets to have the correct order to generate and in-sequence data output.

The multipath controllers may for example comprise a MultiPath Transmission Control Protocol, MPTCP, proxy (as e.g. described in the Internet Engineering Task Force (IETF) RFC 6824 and US2016/0366049A1) which can provide functionality for mapping a single proxy connection to a plurality of subflows. In the system, each of the generated subflows is not merely a path/connection through the network but is specifically linked with a specific radio communication link and thus it represents/is linked to a specific wireless communication link across the air interface.

Specifically, the multipath controllers can use MPTCP in which case the subflows are individual TCP subflows that operate to the MPTCP termination point. There may be a MPTCP instance for each application running on the end node 101 which requires a TCP socket connection. The MPTCP may be terminated in the end node 101 when it operates a native MPTCP protocol stack.

In some embodiments, the multipath controller 715 may comprise (in addition to one (or more) mm wave links/connections) a path/or connection that may utilize a different air interface/radio access technology, such as e.g. an LTE communication link.

In some embodiments, the multipath controller 715 may be arranged to dynamically and flexibly manage the subflow communication. In some embodiments, the multipath controller 715 may be arranged to communicate data simultaneously over several paths/flows. For example, it may maintain a FIFO buffer for each subflow and may allocate new data packets to subflows depending on the level of filling of each subflow buffer. In other embodiments, a slower or less flexible approach may be used. For example, the multipath controller 715 may simply allocate data to one subflow as long as the buffer level does not increase above a given level. If this level is exceeded, it may indicate that the link/path for that subflow is no longer efficient (e.g. due to the mm wave radio communication links for that path no longer being able to support communication) and it may switch to exclusively use a different subflow for future communication.

As previously disclosed, the connection control circuit 1001 may be arranged to select between the first and second mm wave radio communication links, and specifically may be arranged to select between these based on radio link condition indications for the first and second mm wave radio communication links.

A radio link condition indication for a mm wave radio communication link may be any indication of a condition or specifically quality of the link and specifically may be any measure indicative of a signal to noise ratio, capacity, error rate, throughput, signal strength etc.

In some embodiments, a radio link condition indication may specifically be a throughput indication. The throughput indication may for example be determined as a throughput measure derived from measurements of a plurality of parameters.

For example, an access point may report back the received signal to noise ratio and the wireless modem may forward this information to the connection control circuit 1001. The connection control circuit 1001 may then convert this to a throughput value, e.g. based on a predetermined formula or Look-Up-Table (LUT).

In some embodiments, the throughput for a mm wave radio communication link may directly be measured and used as a radio link condition indication.

In many embodiments, a radio link condition indication for a mm wave radio communication link may be a currently applied modulation and coding scheme for the mm wave radio communication link. In many systems, the applied modulation and coding scheme used for communication is dynamically adapted in order to maximize the throughput of the mm wave radio communication link. For example, if the error rate increases above a given threshold, a control message may be transmitted to cause the modulation and coding scheme to be changed to a more reliable but lower data rate scheme and if the error rate decreases below a given threshold, a control message may be transmitted to cause the modulation and coding scheme to be changed to a less reliable but higher data rate scheme.

In such systems, the currently determined modulation and coding scheme may directly reflect a data rate for communication over the mm wave radio communication link. The currently selected/applied scheme may thus reflect the quality of the mm wave radio communication link. For example, the less the attenuation and noise, the higher the data rate.

In some embodiments, a beacon signal strength value may be used as a radio link condition indication. For example, the measured beacon signal strength may be converted into a specific measure indicative of the quality of a mm wave radio communication link such as a throughput or attenuation for that mm wave radio communication link.

Such a radio link condition indication may be particularly advantageous as it is not reliant on active transmission of data over the mm wave radio communication link. It may be used for a mm wave radio communication link which has been established but which is currently not active. In such a case, it is possible that no data is exchanged at all over the mm wave radio communication link. However, the wireless modem supporting the mm wave radio communication link may measure the beacon strength, such as e.g. the current RSSI level, and either use this directly or convert it to another value. For example, a predetermined formula or LUT may provide a throughput estimate or a modulation and coding scheme estimate as a function of the RSSI level.

Management frames may be generated in an access point or modem of an established mm wave link that has not been selected by the connection control circuit. These frames are transmitted to the other end of the link, but no further. These can be used to carry measurements. Further, measurements such as signal strength can be performed on the management frames themselves.

It will be appreciated that a plurality of radio link condition indications may be used for each mm wave radio communication link or equivalently that each radio link condition indication may be a composite indication comprising a plurality of values or a combined value for a plurality of parameters indicative of a radio link condition.

It will be appreciated that the connection control circuit 1001 may apply any suitable algorithm for selecting between the first and the second mm wave radio communication links, and in particular may apply a comparison criterion between the radio link condition conditions for the two mm wave radio communication links.

For example, in some embodiments, the connection control circuit 1001 may simply be arranged to select the mm wave radio communication link for which the radio link condition indication indicative of the highest quality is received. Such a decision may for example include a suitable amount of low pass filtering and/or hysteresis.

For example, the connection control circuit 1001 may be arranged to select the mm wave radio communication link with the highest (low pass filtered) RSSI or throughput indication. As another example, it may be arranged to switch from one mm wave radio communication link to the other if this exceeds the quality indication of the current mm wave radio communication link by more than a given threshold value.

As a specific example, the selection may be based on averaged beacon RSSI from the access points. In this example, the connection control circuit 1001 may compare the averaged RSSI values for the currently selected mm wave radio communication link to that of the currently non-selected mm wave radio communication link. If this is higher by a given amount for longer than a given duration, then the connection control circuit 1001 may change the selection.

Once the connection control circuit 1001 selects a mm wave radio communication link (or changes the mm wave radio communication link) it controls the first connection control circuit 1001 to achieve the corresponding switching (the switch itself may be considered part of the first connection control circuit 1001 or the connection control circuit 1001 may control a separate or external switching of data).

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example and shall not be construed as limiting the scope of the claims in any way.

We claim:

1. A communication system for supporting communication between an end node of a vehicle and a remote correspondent node via a fixed network, the communication system comprising:

a plurality of wireless access points of the fixed network, each wireless access point having a directional antenna arrangement for mm wave radio communication using directional beams;

a first wireless modem arranged to establish a first link being a first mm wave radio communication link to a first access point, the first link supporting a data session between the end node and the remote correspondent node, the first wireless modem being located on the vehicle and employing a first electronically steerable beamforming directional antenna having a first main beam for establishing the first mm wave radio communication link;

a second wireless modem arranged to establish a second link being a second mm wave radio communication link to a second access point further supporting the data session, the second wireless modem being located on the vehicle and employing a second electronically steerable beamforming directional antenna having a second main beam for establishing the second mm wave radio communication link;

a common network element located on the vehicle and arranged to support communication for the data session over both the first mm wave radio communication link and the second mm wave radio communication link;

a connection control circuit located on the vehicle and arranged to dynamically switch between the first mm wave radio communication link and the second mm wave radio communication link for the data session; and wherein the connection control circuit is arranged to transmit an address resolution message to the second access point over the second mm wave radio communication link for a switch from the first mm wave radio communication link to the second mm wave radio communication link; the address resolution message comprising identification data for the common network element.

2. The communication system of claim 1, wherein the first access point and the second access point are different access points.

3. The communication system of claim 1, wherein the second access point is arranged to transmit a routing update message in response to receiving the address resolution message, the routing update message comprising identification data of the common network element.

4. The communication system of claim 1, wherein the second access point is arranged to transmit a routing update message in response to receiving the address resolution message, the routing update message comprising an indication of an association between the second access point and the common network element.

5. The communication system of claim 1, wherein the second access point is arranged to transmit the address resolution message in the fixed network.

6. The communication system of claim 1 wherein the first access point and the second access point are a common access point.

7. The communication system of claim 6, wherein the common access point is arranged not to transmit a routing update message into the fixed network in response to receiving the address resolution message.

8. The communication system of claim 6, wherein the common access point is arranged to update a forwarding path for the data session from the first wireless modem to the second wireless modem in response to a detection that the address resolution message is received via the second mm wave radio communication link.

9. The communication system of claim 1, wherein the identification data comprises an IP address for the common network element.

10. The communication system of claim 1, wherein the identification data comprises a MAC address for an interface of the common network element coupling to the end node.

11. The communication system of claim 1, wherein the common network element comprises a network bridge.

12. The communication system of claim 11, wherein the connection control circuit is arranged to dynamically switch between the first mm wave radio communication link and the second mm wave radio communication link interface by adding and removing interfaces of the bridge, the interfaces being interfaces to which respectively the first wireless modem and the second wireless modem are connected.

13. The communication system of claim 1, wherein the common network element is a network bridge implementing a first interface for the first wireless modem, a second interface for the second wireless modem, and a third interface for a wired connection to the end node, and wherein the connection control circuit is arranged to switch between the first and second first mm wave radio communication links by activating one of the first interface and the second interface and deactivating the other of the first interface and the second interface.

14. The communication system of claim 1, wherein the address resolution message is a Gratuitous Address Resolution Protocol, GARP, message.

15. The communication system of claim 1, wherein the common network element is arranged to provide a first single wired connection point for the data session, the first single wired connection point being common for the first mm wave radio communication link and the second mm wave radio communication link.

16. The communication system of claim 1, wherein the connection control circuit is arranged to select between the first mm wave radio communication link and the second mm wave radio communication link in response to a comparison of radio link condition indications for the first mm wave radio communication link and the second mm wave radio communication link.

17. The communication system of claim 1, wherein the first electronically steerable beamforming directional antenna and the second electronically steerable beamforming directional antenna are arranged to form beams in different directions.

18. The communication system of claim 1, wherein the connection control circuit is positioned on the vehicle.

19. The communication system of claim 1, further comprising:
multipath controller arranged to communicate with a complementary multipath controller of the fixed network over a plurality of paths, the multipath controller having a first wired port for a first path of the plurality of paths connected to a first single wired connection point.

20. The communication system of claim 1, wherein the connection control circuit is arranged to further transmit a second address resolution message to the first access point over the first mm wave radio communication link for a switch from the second mm wave radio communication link to the first mm wave radio communication link; the address resolution message comprising identification data for the common network element.

21. An apparatus for a communication system for supporting communication between an end node of a vehicle and a remote correspondent node via a fixed network, the communication system comprising:
a plurality of wireless access points of the fixed network, each wireless access point having a directional antenna arrangement for mm wave radio communication using directional beams;
a first wireless modem arranged to establish a first link being a first mm wave radio communication link to a first access point, the first link supporting a data session between the end node and the remote correspondent node, the first wireless modem being located on the vehicle and employing a first electronically steerable beamforming directional antenna having a first main beam for establishing the first mm wave radio communication link;
a second wireless modem arranged to establish a second link being second mm wave radio communication link to a second access point further supporting the data session, the second wireless modem being located on the vehicle and employing a second electronically steerable beamforming directional antenna having a second main beam for establishing the second mm wave radio communication link;
a common network element located on the vehicle and arranged to support communication for the data session over both the first mm wave radio communication link and the second mm wave radio communication link;
and the apparatus comprising:
a connection control circuit located on the vehicle and arranged to dynamically switch between the first mm wave radio communication link and the second mm wave radio communication link for the data session; and wherein
the connection control circuit is arranged to transmit an address resolution message to the second access point over the second mm wave radio communication link for a switch from the first mm wave radio communication link to the second mm wave radio communication link; the address resolution message comprising identification data for the common network element.

22. A method of operation for a communication system for supporting communication between an end node of a vehicle and a remote correspondent node via a fixed network, the communication system comprising:
a plurality of wireless access points of the fixed network, each wireless access point having a directional antenna arrangement for mm wave radio communication using directional beams;
a first wireless modem for establishing a first link being a first mm wave radio communication link to a first access point, the first link supporting a data session between the end node and the remote correspondent node, the first wireless modem being located on the vehicle and employing a first electronically steerable beamforming directional antenna having a first main beam for establishing the first mm wave radio communication link;

a second wireless modem for establishing a second link being second mm wave radio communication link to a second access point further supporting the data session, the second wireless modem being located on the vehicle and employing a second electronically steerable beamforming directional antenna having a second main beam for establishing the second mm wave radio communication link;

a common network element located on the vehicle and arranged to support communication for the data session over both the first mm wave radio communication link and the second mm wave radio communication link;

and the method comprising:

dynamically switching between the first mm wave radio communication link and the second mm wave radio communication link for the data session; and transmitting from the vehicle an address resolution message to the second access point over the second mm wave radio communication link for a switch from the first mm wave radio communication link to the second mm wave radio communication link; the address resolution message comprising identification data for the common network element.

* * * * *